US011627656B2

(12) United States Patent
Ahmed et al.

(10) Patent No.: US 11,627,656 B2
(45) Date of Patent: Apr. 11, 2023

(54) SLITTED PCB FOR OMNI-DIRECTIONAL LIKE PERFORMANCE OF OFF-CENTER MOUNTED ANTENNAS OF PASSIVE ACCESS SYSTEMS

(71) Applicants: DENSO International America, Inc., Southfield, MI (US); DENSO CORPORATION, Kariya (JP)

(72) Inventors: Osman Ahmed, Bloomfield Hills, MI (US); Zaki Hamad, Canton, MI (US); Jason Summerford, Novi, MI (US); Riad Ghabra, Northville, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 91 days.

(21) Appl. No.: 17/218,972

(22) Filed: Mar. 31, 2021

(65) Prior Publication Data
US 2022/0192008 A1    Jun. 16, 2022

Related U.S. Application Data

(60) Provisional application No. 63/123,536, filed on Dec. 10, 2020.

(51) Int. Cl.
  *H05K 1/18*    (2006.01)
  *H01Q 1/44*    (2006.01)
  (Continued)

(52) U.S. Cl.
  CPC ........... *H05K 1/0225* (2013.01); *B60R 25/20* (2013.01); *H01Q 1/48* (2013.01); *H04B 1/38* (2013.01);
  (Continued)

(58) Field of Classification Search
  CPC ...... H04B 1/38; H04B 1/3822; H04B 1/3833; H04B 1/3827; H04W 1/0225; H04W 4/44;
  (Continued)

(56) References Cited

U.S. PATENT DOCUMENTS

| 7,102,572 B2 * | 9/2006 | Okado | ..................... H01Q 1/38 343/846 |
| 9,688,247 B1 | 6/2017 | Jayaraman et al. | |

(Continued)

FOREIGN PATENT DOCUMENTS

| BR | 102014017465 A2 | 2/2016 |
| CN | 104574593 A | 4/2015 |

(Continued)

*Primary Examiner* — Blane J Jackson
(74) *Attorney, Agent, or Firm* — Harness, Dickey & Pierce, P.L.C.

(57) ABSTRACT

A radio frequency (RF) circuit is provided and includes an antenna, a printed circuit board and a RF chip. The printed circuit board includes a stack of layers. The stack of layers includes a grounded layer. The grounded layer includes a slit, a dielectric area, a first grounded area and a second grounded area. The dielectric area includes dielectric material and is disposed between the first grounded area and the second grounded area. The antenna is edge mounted to the ground layer adjacent the dielectric area and offset from a centerline of the ground layer. The second grounded area is disposed between the dielectric area and the slit. The RF chip is mounted to the stack of layers and connected to the antenna via a transmission line and configured to transmit and receive RF signals via the antenna.

29 Claims, 13 Drawing Sheets

(51) Int. Cl.
*H01Q 1/22* (2006.01)
*H05K 1/02* (2006.01)
*H04B 1/38* (2015.01)
*H01Q 1/48* (2006.01)
*H04W 4/44* (2018.01)
*B60R 25/20* (2013.01)
*H04W 12/06* (2021.01)

(52) U.S. Cl.
CPC ............... *H04W 4/44* (2018.02); *H05K 1/18* (2013.01); *B60R 2325/105* (2013.01); *H04W 12/06* (2013.01); *H05K 2201/09163* (2013.01); *H05K 2201/10098* (2013.01)

(58) Field of Classification Search
CPC ......... H04W 12/06; H05K 1/18; H05K 1/181; B60K 25/20
See application file for complete search history.

(56) References Cited

U.S. PATENT DOCUMENTS

| | | |
|---|---|---|
| 9,794,753 B1 | 10/2017 | Stitt et al. |
| 9,894,492 B1 | 2/2018 | Elangovan et al. |
| 10,002,479 B2 | 6/2018 | Oz et al. |
| 10,328,898 B2 | 6/2019 | Golsch et al. |
| 10,328,899 B2 | 6/2019 | Golsch |
| 2011/0215921 A1 | 9/2011 | Ben Ayed et al. |
| 2012/0045058 A1 | 2/2012 | Weghaus |
| 2014/0274013 A1 | 9/2014 | Santavicca |
| 2015/0035714 A1* | 2/2015 | Zhou ................. H01Q 3/26 343/767 |
| 2015/0148989 A1 | 5/2015 | Cooper et al. |
| 2015/0161832 A1 | 6/2015 | Esselink et al. |
| 2015/0310681 A1 | 10/2015 | Avery et al. |
| 2015/0356797 A1 | 12/2015 | McBride et al. |
| 2016/0150407 A1 | 5/2016 | Michaud et al. |
| 2017/0062938 A1 | 3/2017 | Cheng et al. |
| 2017/0104589 A1 | 4/2017 | Lambert et al. |
| 2017/0132533 A1 | 5/2017 | Darnell et al. |
| 2017/0309098 A1 | 10/2017 | Watters et al. |
| 2017/0330402 A1 | 11/2017 | Menard et al. |
| 2018/0029560 A1 | 2/2018 | Mohaupt et al. |
| 2018/0099643 A1 | 4/2018 | Golsch et al. |
| 2018/0103414 A1 | 4/2018 | Golsch |
| 2018/0126952 A1 | 5/2018 | Niemiec |
| 2018/0154865 A1 | 6/2018 | Bianchi, III et al. |
| 2018/0269565 A1 | 9/2018 | Guthrie et al. |
| 2020/0266523 A1* | 8/2020 | Park ................. H01Q 1/48 |
| 2022/0263251 A1* | 8/2022 | Nabki ............... H04B 1/0458 |

FOREIGN PATENT DOCUMENTS

| | | |
|---|---|---|
| WO | 16156682 A1 | 10/2016 |
| WO | 2017181050 A1 | 10/2017 |
| WO | 18040641 A1 | 3/2018 |

* cited by examiner

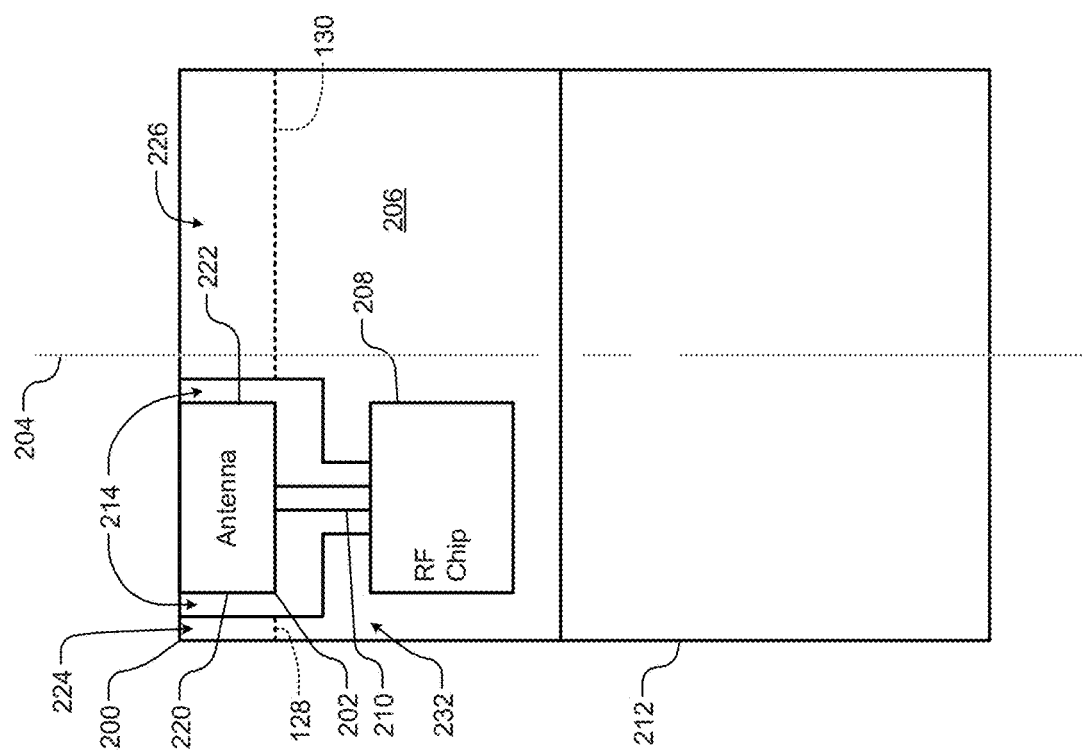
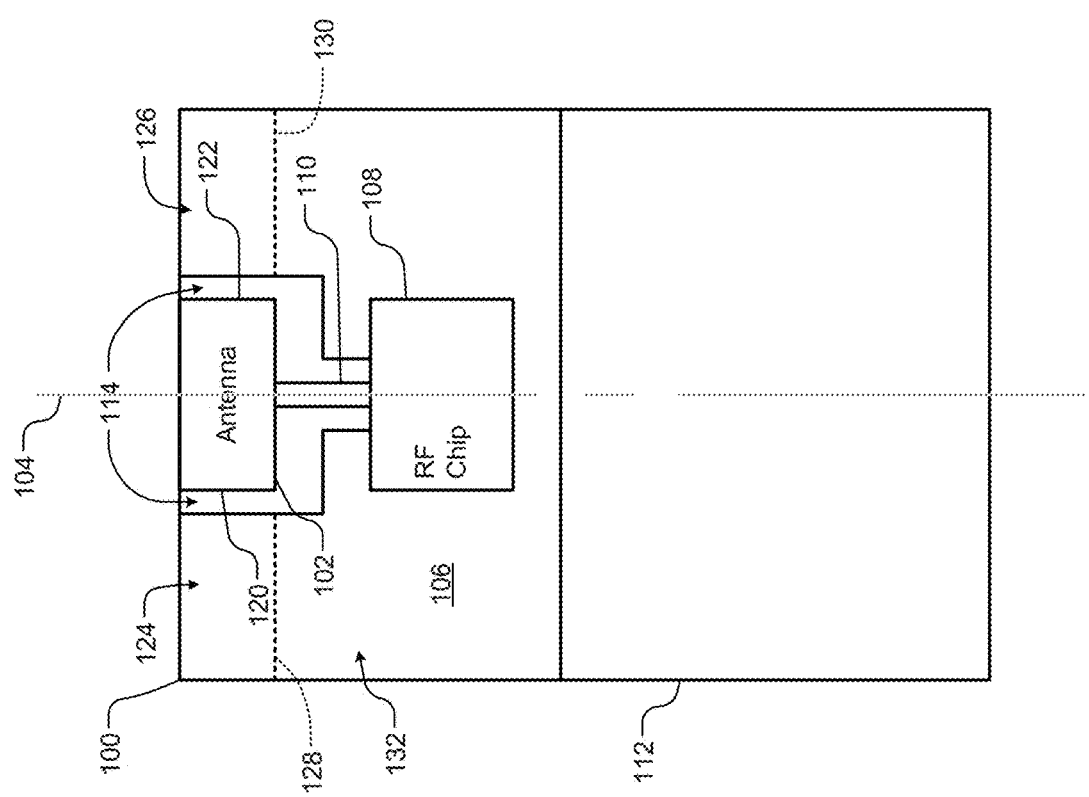

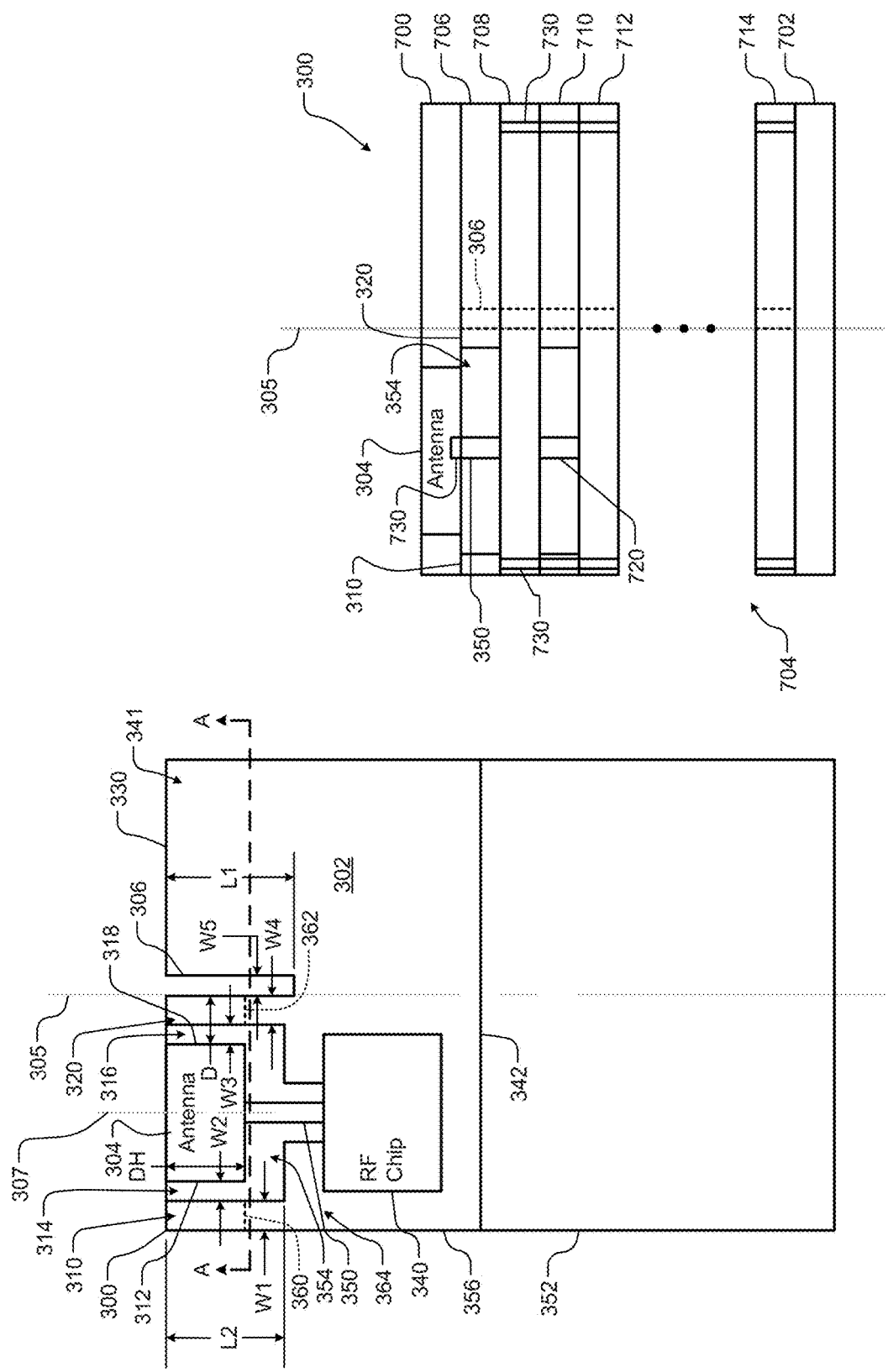

SLITTED PCB FOR OMNI-DIRECTIONAL LIKE PERFORMANCE OF OFF-CENTER MOUNTED ANTENNAS OF PASSIVE ACCESS SYSTEMS

CROSS-REFERENCE TO RELATED APPLICATIONS

This application claims the benefit of U.S. Provisional Application No. 63/123,536, filed on Dec. 10, 2020. The entire disclosure of the application referenced above is incorporated herein by reference.

FIELD

The present disclosure relates to passive entry/passive start systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional passive entry/passive start (PEPS) systems allow keyless entry including providing a user access to various vehicle functions if the user possesses a key fob that has been paired with an in-vehicle PEPS electronic control unit (or PEPS module). As an example, the user in possession of the key fob may approach a vehicle having the PEPS module. The key fob communicates with the PEPS module and if the key fob is authenticated, the PEPS module may unlock doors of the vehicle. The PEPS module (i) performs an authentication process to determine if the key fob is authorized to access the vehicle, and (ii) determines a location of the key fob relative to the vehicle. The authentication process may include the exchange of an encrypted password or signature. If the password or signature is correct, then the key fob is determined to be authorized. Location of the key fob may be determined based on, for example, strength of a signal received from the key fob. If the key fob is authenticated and is located within an authorized zone of the vehicle, then access to the interior of the vehicle is permitted without use of a traditional key.

As another example, the user in possession of the key fob may activate a vehicle function by pushing a button on the key fob. In response to pushing the button, the key fob communicates with the PEPS module and if the key fob is authenticated and within a predetermined distance of the vehicle, the PEPS module performs the stated function (e.g., starts the vehicle, opens a door, sets off an alarm, etc.) associated with the button pressed on the key fob. The communication performed for the two examples may include the key fob and the PEPS module performing a one-way low-frequency (LF) wake-up function and a one-way or two-way radio frequency (RF) authentication function.

A phone as a key (PAK) vehicle access system can operate similarly as the stated PEPs system, except the vehicle is accessed using a mobile phone rather than a key fob. As an example, the mobile phone can communicate with a PAK module or a telematics control unit (TCU) in the vehicle to begin an access pairing process. The mobile phone and either the PAK module or the TCU perform the access pairing process to establish a trust relationship. The pairing process can include Bluetooth® pairing whereby: security information is exchanged between the mobile phone and the vehicle directly; a mobile phone address, a mobile phone identity resolving key, a reservation identifier and/or an encryption key are exchanged via a cloud-based network; and/or the mobile phone presents a certificate to the vehicle, where the certificate is signed by (i) the mobile phone, (ii) a trusted security signing authority such as a manufacturer of the vehicle, and/or (iii) a trusted third party. In the case of a certificate, the certificate can include an identifier of a person authorized to access a vehicle, an identifier of a cloud-based network authorized to transfer the certificate, an identifier of a rental or lease agreement of the vehicle, an identifier of the vehicle, a date and time period during which the vehicle is permitted for use by the authorized person, and/or other restrictions and/or access/license information.

For passive entry, some user action is typically needed to initiate a process of waking up a key fob or mobile phone (referred to as portable access devices). For example, this may include a user approaching the vehicle with a portable access device and/or touching and/or pulling on a door handle. When a PEPS module or a PAK module, which are referred to as access modules, detects this behavior, the access module performs a localization process to begin searching for and waking up the key fob.

A controller of the key fob measures a LF signal level during communication with the access module. The controller determines a received signal strength indicator (RSSI) and provides the RSSI to the access module. The access module then determines a location of the key fob based on the RSSI.

A smartphone, a wearable device, and/or other smart portable network device may perform as a key fob. The smart portable network devices may enable various vehicle functions and long range distancing features, such as passive welcome lighting, distance bounding on remote parking applications, etc.

SUMMARY

A radio frequency (RF) circuit is provided and includes an antenna, a printed circuit board and a RF chip. The printed circuit board includes a stack of layers. The stack of layers includes a grounded layer. The grounded layer includes a slit, a dielectric area, a first grounded area and a second grounded area. The dielectric area includes dielectric material and is disposed between the first grounded area and the second grounded area. The antenna is edge mounted to the ground layer adjacent the dielectric area and offset from a centerline of the ground layer. The second grounded area is disposed between the dielectric area and the slit. The RF chip is mounted to the stack of layers and connected to the antenna via a transmission line and configured to transmit and receive RF signals via the antenna.

In other features, the slit extends through the stack of layers of the printed circuit board.

In other features, a width of the second grounded area on a second side of the antenna is within a predetermined range of a width of the first grounded area on a first side of the antenna opposite the second side of the antenna.

In other features, a width of the second grounded area on a second side of the antenna is equal to a width of the first grounded area of a first side of the antenna opposite the second side of the antenna.

In other features, the first grounded area and the second grounded area are geometrically symmetric relative to a centerline of the antenna.

In other features, the first grounded area and the second grounded area are not geometrically symmetric relative to a centerline of the antenna.

In other features, a width of the first grounded area and a width of the second grounded area are greater than a quarter wavelength of the RF signals.

In other features, a width of the slit is greater than a tenth of an effective wavelength of the RF signals, where the effective wavelength is equal to a wavelength divided by a square root of a dielectric constant of a dielectric material disposed between the transmission line and a ground line.

In other features, a length of the slit into the printed circuit board is equal to or within a predetermined range of one half an effective wavelength of the RF signals, where the effective wavelength is equal to a wavelength divided by a square root of a dielectric constant of a dielectric material disposed between the transmission line and a ground line.

In other features, at least one dimension of the slit is based on a frequency of at least one of the RF signals.

In other features, at least one dimension of the second grounded area is based on a frequency of at least one of the RF signals.

In other features, a material of the printed circuit board is based on a frequency of at least one of the RF signals.

In other features, the antenna is mounted to a first side of the printed circuit board. The RF chip is mounted to a second side of the printed circuit board opposite the first side.

In other features, the first side is a top side of the printed circuit board and the second side is a bottom side of the printed circuit board.

In other features, the first side is a bottom side of the printed circuit board and the second side is a top side of the printed circuit board.

In other features, the antenna is mounted to a same side of the printed circuit board as the RF chip.

In other features, the first grounded area is on a first side of the antenna. The second grounded area is on a second side of the antenna. The antenna is mounted along an edge of the printed circuit such that a third side of the antenna is adjacent to the edge. The transmission line extends from a fourth side of the antenna opposite the third side.

In other features, the antenna is at least one of linear polarized, circular polarized, spherically polarized, is toroidally polarized.

In other features, the RF signals are in at least one of a 2.4 GHz band, an 8 GHz band, or over an ultra-wideband range of 500 MHz.

In other features, a first network device is provided and includes the RF circuit and a module configured to exchange RF signals with a second network device via the antenna. The first network device is a portable network device or a network device mounted within a vehicle.

In other features, a vehicle is provided and includes the RF circuit and an access module configured to: exchange the RF signals with an access device separate from the vehicle via the antenna to authenticate the access device and determine a range of the access device relative to the vehicle; and based on the range of the access device, permit access to the vehicle.

In other features, an access device is provided and includes the RF circuit and a control module configured to exchange the RF signals with a vehicle via the antenna to authenticate the access device and provide access to the vehicle.

In other features, a RF circuit is provided and includes an antenna, a printed circuit board and a RF chip. The printed circuit board includes a stack of layers. The stack of layers includes a grounded layer and a slit that extends through the stack of layers. The grounded layer includes a dielectric area, a first grounded area and a second grounded area. The dielectric area includes dielectric material and is disposed between the first grounded area and the second grounded area. The antenna is mounted to the ground layer adjacent the dielectric area and offset from a centerline of the ground layer. The second grounded area is disposed between the dielectric area and the slit, wherein a width of the second grounded area between the dielectric area and the slit is within a predetermined range of a width of the first grounded area between the dielectric area and an edge of the grounded layer. The RF chip is mounted to the stack of layers and connected to the antenna via a transmission line and configured to transmit and receive RF signals via the antenna.

In other features, the width of the second grounded area is equal to the width of the first grounded area.

In other features, a width of the first grounded area and a width of the second grounded area are greater than a quarter wavelength of the RF signals.

In other features, a width of the slit is greater than a tenth of an effective wavelength of the RF signals, where the effective wavelength is equal to a wavelength divided by a square root of a dielectric constant of a dielectric material disposed between the transmission line and a ground line.

In other features, a length of the slit into the printed circuit board is equal to or within a predetermined range of one half an effective wavelength of the RF signals, where the effective wavelength is equal to a wavelength divided by a square root of a dielectric constant of a dielectric material disposed between the transmission line and a ground line.

In other features, the first grounded area and the second grounded area are geometrically symmetric relative to a centerline of the antenna.

In other features, the first grounded area and the second grounded area are not geometrically symmetric relative to a centerline of the antenna.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a top view of a printed circuit board (PCB) including an antenna that is edge-mounted and centrally and symmetrically disposed relative to a laterally extending centerline of a grounded layer of the PCB;

FIG. 2 is a top view of a PCB including an antenna that is edge-mounted and offset relative to a laterally extending centerline of a grounded layer of the PCB;

FIG. 3 is a PCB including a slitted PCB including slitted grounded layers and an antenna that is edge-mounted and offset in accordance with the present disclosure;

FIG. 7 is a side cross-sectional view through line A-A of FIG. 3;

In the drawings, reference numbers may be reused to identify similar and/or identical elements.

DETAILED DESCRIPTION

Figure 6:
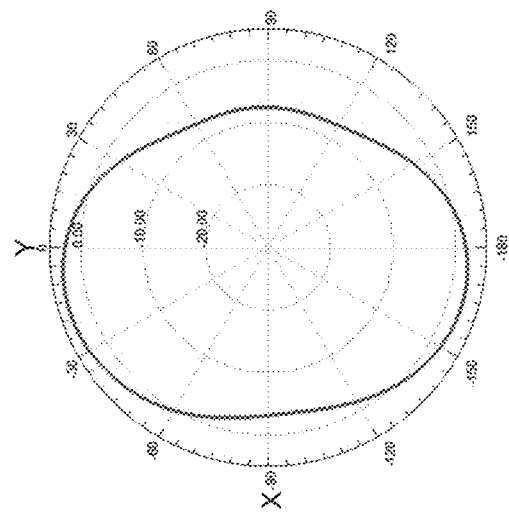
FIG. 6 is a plot illustrating an example radiation pattern of the antenna of FIG. 3.

An antenna may be edge-mounted (i.e. mounted along an edge) of a PCB to provide space for other circuit components, such as a radio frequency (RF) chip, a processor, a memory, and/or other electronic components. The antenna may be (i) centrally mounted along the edge and be disposed relative to a lateral centerline of a grounded layer of the PCB, for example, in an X direction or a Y direction (e.g., symmetrically disposed relative to the centerline), or (ii) offset relative to the centerline, such that the antenna is not symmetrically disposed relative to the centerline.

FIG. 1 shows an example of a PCB 100 including an antenna 102 that is edge-mounted and centrally and symmetrically disposed relative to a laterally extending centerline 104 of a grounded layer 106 of the PCB 100. The centerline 104 is a centerline of the grounded layer 106 and may also be a centerline of the PCB 100. A RF chip 108 may be mounted on the PCB 100 over a portion of the grounded layer 106. The RF chip 108 may transmit a signal to or receive a signal from the antenna 102 via a conductive transmission line 110, which extends from the RF chip 108 to the antenna 102. As an example, the grounded layer 106 may cover a portion of the PCB 100 (or substrate), not cover another portion 112 of the PCB 100, and surround an area below the antenna 102. A dielectric (or non-conductive) area 114 may surround the area below the antenna 102. The grounded layer 106 may surround the dielectric area 114. A ground line may be disposed in a same layer as the grounded layer 106 and extend from below the RF chip 108, under the transmission line 110, and to and/or towards the antenna 102. The combination of the ground line and the transmission line 110 direct a RF signal from the RF chip 108 to the antenna 102 and prevent the transmission line 110 from performing as part of the antenna 102.

The antenna 102 may be a chip-scale antenna and is disposed symmetrically relative to the centerline 104 (referred to as axis-of-symmetry). When symmetrically located, equal amounts of grounded surface area exist on a first side 120 of the antenna and on a second (or opposing) side 122 of the antenna 102 when viewed from a top of the antenna 102 and the grounded layer 106. Grounded surface areas 124, 126 are shown and are referred to as active areas through which a majority of current flows. Dashed lines 128, 130 along sides of the surfaces areas 124, 126 are provided to indicate example transitions between the active areas 124, 126 and a non-active area 132 of the grounded layer 106 with respect to current transmitted to or from the antenna 102. The dashed lines 128, 130 may be in different locations than shown and are provided as representative examples.

The first side 120 and the second side 122 of the antenna 102 may extend parallel to the centerline 104 and/or refer to sides of the antenna 102 along which the transmission line 110 is not connected. The equal amounts of grounded surface area (or surfaces areas of the grounded layer 106) on the first and second sides 120, 122 of the antenna 102 provide a balanced structure, which allows the antenna 102 to perform more like an omni-directional antenna.

An omni-directional antenna refers to an antenna that receives and transmits signals with the same signal strength regardless of the orientation of the antenna. An omni-directional antenna of a key fob, smart phone, and/or other portable network device receives and transmits signals with the same signal strength regardless of the orientation of the portable network device.

FIG. 2 shows a PCB 200 including an antenna 202 that is edge-mounted and offset relative to a laterally extending centerline 204. The centerline 204 is a centerline of the grounded layer 206 and may also be a centerline of the PCB 200. The structure shown in FIG. 2 is similar to the structure shown in FIG. 1, except the structure is configured with the antenna 202 being offset relative to the centerline 204.

A RF chip 208 may be mounted on the PCB 200 over a portion of the grounded layer 206. The RF chip 208 may transmit a signal to or receive a signal from the antenna 202 via a conductive transmission line 210, which extends from the RF chip 208 to the antenna 202. As an example, the grounded layer 206 may cover a portion of the PCB 200 (or substrate), not cover another portion 212 of the PCB 200, and surround an area below the antenna 202. A dielectric (or non-conductive) area 214 may surround the area below the antenna 202. The grounded layer 206 may surround the dielectric area 214. A ground line may be disposed in a same layer as the grounded layer 206 and extend from below the RF chip 208, under the transmission line 210, and to and/or towards the antenna 202. The combination of the ground line and the transmission line 210 direct a RF signal from the RF chip 208 to the antenna 202 and prevent the transmission line 210 from performing as part of the antenna 202.

The antenna 202 may be a chip-scale antenna and is disposed offset from the centerline 204. As a result, a different amount of grounded surface area exists on a first side 220 of the antenna than on a second (or opposing) side 222 of the antenna 202 when viewed from a top of the antenna 202 and the grounded layer 206. Grounded surface areas 224, 226 are shown and are referred to as active areas through which a majority of current flows. Dashed lines 228, 230 along sides of the surfaces areas 224, 226 are provided to indicate example transitions between the active areas 224, 226 and a non-active area 232 of the grounded layer 206 with respect to current transmitted to or from the antenna 202. The dashed lines 228, 230 may be in different locations than shown and are provided as representative examples.

The first side 220 and the second side 222 of the antenna 202 may extend parallel to the centerline 204 and/or refer to sides of the antenna 202 along which the transmission line 210 is not connected. The unequal amounts of grounded surface area on the first and second sides 220, 222 of the antenna 202 provide an unbalanced structure, which results in the antenna 202 not performing as an omni-directional antenna.

The examples set forth herein include PCBs with slitted grounded layers to cause antennas mounted on the PCBs to perform as or more like omni-directional antennas. Each PCB or other antenna supporting structure includes one or more grounded layers, which are connected to a ground reference. Each of the grounded layers is a conductive layer and may include a slit that divides a surface area of the grounded layer on a second side of an antenna opposite a first side of the antenna. The surface area on the second side of the antenna refers to a portion of the grounded layer between the antenna and the slit, which is approximately equal is size as a surface area of the grounded layer on the first (or other opposing) side of the antenna. This provides a balanced structure for more omni-directional like performance. This performance is provided agnostic to the type of antenna attached. The omni-directional like performance is provided regardless of whether the antenna is linear polarized, circular polarized, spherically polarized, toroidally polarized, or polarized in some other manner. The slitted structure applies to any antenna polarization. This performance is also provided for both signal transmission and reception. The slitted structures may be implemented for any antenna of a vehicle and/or a portable network device (or portable access device). More omni-directional like performance is provided independent of whether the antenna has a two-dimensional radiation pattern or a three-dimensional radiation pattern.

FIG. 3 shows a slitted PCB 300 including a slitted grounded layer 302 and an antenna 304 that is edge-mounted and offset relative to a centerline 305 of the grounded layer 302 and/or the PCB 300. The slitted PCB 300 and corresponding RF circuit including the antenna 304 may be implemented in any of the network devices referred to herein including portable (or mobile) network devices and network devices mounted within a vehicle. The slitted grounded layer 302 includes a slit 306, which may be disposed on an opposite side of the centerline 305 as the antenna 304. Although the slit 306 is primarily described with respect to the grounded layer 302, the slit, as shown, may extend through the PCB 300. The term "slit" as used herein refers to an open-to-air gap between portions of a PCB. A slit may exist in one or more stacked layers of the PCB. In one embodiment, a slit is provided in a first one or more stacked layers and is not provided in a second one or more stacked layers distinct from and stacked with the first one or more stacked layers. An example centerline 307 of the antenna 304 is shown and may extend parallel to the centerline 305.

The slit 306 may be: entirely on the opposite side of the centerline 305 as the antenna 304 as shown; may overlap the centerline 305; or be on the same side of the centerline 305 as the antenna 304. A position of the slit 306 relative to the centerline 305 may be dependent on a width W1 of a grounded surface area 310 on a first side 312 of the antenna 304; widths W2, W3 respectively of dielectric areas 314, 316 on first and second sides 312, 318 of the antenna 304; a distance D between the antenna 304 and the centerline 305 and/or a distance D' (not shown) between the antenna 304 and the slit 306; and a width W4 of a grounded surface area 320 on a second side 318 of the antenna 304 opposite the first side 312. In the example shown, the distance D is equal to the distance D', but may be different. The distance D' between the antenna 304 and the slit 306 is selected to ensure equal grounding on sides 312, 318 of the antenna 304.

The slit 306 has a width W5 and a length L1 when viewed from a top of the slit 306. The length L1 refers to how deep from edge to center the slot 306 extends into the PCB 300 and thus may be referred to as the slot depth. In one embodiment, the width W5 of the slit 306 is selected to decouple the grounded areas 320 and 341 and is larger than one tenth an effective wavelength (or $\lambda_{eff}/10$) for adequate operation, where $\lambda_{eff}$ is equal to $\lambda$ of a transmitted or received RF signal divided by a square root of a material dielectric constant dk (or $\lambda_{eff}=\lambda/\sqrt{dk}$). The wavelength A is a wavelength of a RF signal through air and is defined as the speed of light C divided by a frequency of operation of the antenna 304 (or frequency of the RF signal). The dielectric constant dk refers to a dielectric constant of dielectric material of the PCB 300, which may be the dielectric constant of dielectic material below the transmission line 350.

The length L1 is longer that a depth DH of the antenna 304 and lengths of the sides 312, 318 and may be longer than a length L2 of the dielectric areas 314, 316 along the sides 312, 318 of the antenna 304. The lengths of the sides 312, 318 may be equal to or different than the depth DH. The lengths of the sides 312, 318 and the dielectric areas 314, 316 may be measured from a first edge 330 of the grounded layer 302 and/or an edge of the PCB 300, which may be above or below the first edge 330, and towards a RF chip 340 and/or a second edge 342 on an opposite side of the grounded layer 302. The length L1 is greater than the lengths of the sides 312, 318 to ensure greater decoupling between the grounded area 320 and a grounded area 341 on an opposite side of the slit 306 as the grounded area 320.

In one embodiment, the length L1 of the slit 306 is set equal to or within a predetermined range of $\lambda_{eff}/2$. The length L1 of the slit 306 is limited to not extend too far into the PCB 300. In one embodiment, the length L1 is limited to not extend to the RF chip 340. Limiting the length of the slit 306 maintains mechanical integrity of the PCB 300 and electrical integrity of electrical components, such as the RF chip 340, capacitors, a processor, and/or other electrical components mounted to the PCB 300. The limited length of the slit 306 also aids in minimizing size of the PCB 300. The antenna 304 may be disposed along the first edge 330 as shown or set a predetermined distance from the first edge 330.

In one embodiment, (i) the width W3 is equal to and/or within a first predetermined range of the width W2, and (ii) the width W4 is equal to and/or within a second predetermined range of the width W1. The first and second predetermined ranges may be for example less than or equal to 5% of W2 and W1, respectively. In one embodiment, the width W1 and W4 are greater than a quarter effective wavelength (or $\lambda_{eff}/4$) of transmitted and/or received RF signals to ensure adequate performance. The parameters W1, W2, W3, W4, D, W5 and L1 may be determined based on frequencies of signals being transmitted and/or received using the antenna 304. The parameters W1, W2, W3, W4, D, W5 and L1 may also or alternatively be determined based on material makeup of the antenna 304, the grounded layer 302, the dielectric areas 314, 316, and/or of other layers and/or areas of the PCB 300. The length of the slit L1 may be equal to $\lambda/2$ or $\lambda/4$ of one or more RF signals transmitted from and/or received by the antenna 304.

The RF chip 340 may be mounted on the PCB 300 over a portion of the grounded layer 302. The RF chip 340 may transmit signals to or receive signals from the antenna 304 via a conductive transmission line 350, which extends from the RF chip 340 to the antenna 304. The transmission line 350 may be part of the grounded layer 302. The grounded layer 302 may cover a portion of the PCB 300 (or substrate) leaving a non-covered portion 352 and surround an area below the antenna 304. The non-covered portion 352 may include dielectric material instead of conductive material at the stacked level of the grounded layer 302. Components, such as coils or near field communication components that do not need to be tied to ground may be mounted in the non-covered portion 352. A dielectric (or non-conductive) area 354, which includes the areas 314, 316 may surround and/or fill the area below the antenna 304. The grounded layer 302 may surround the dielectric area 354.

A ground line 720 (shown in FIG. 7) may be disposed in a second conductive (or ground layer) below the grounded layer 302 and extend from below the RF chip 340, under the transmission line 350, and up to a point below which the transmission line 350 contacts or connects to the antenna 304. The ground line 720 does not extend under the antenna 304. The combination of the ground line and the transmission line 350 direct a RF signal from the RF chip 340 to the antenna 304 and prevent the transmission line 350 from performing as part of the antenna 304. The transmission line 350 and other transmission lines referred to herein are not tied to ground, but rather extend parallel to ground lines. A pattern of the ground layer 302 and dielectric material of that layer may be repeated in conductive (or grounded) layers below the ground layer 302, such that the layout of the conductive layer 302 is repeated in each of the other conductive layers. In an embodiment, the conductive (or grounded) layers are disposed across the whole PCB 300. The conductive layers may have a different pattern than shown in FIG. 3.

The antenna 304 may be a chip-scale antenna and is disposed offset from the centerline 305. The inclusion of the slit 306, results in similar amounts of grounded surface area existing on the first side 312 of the antenna 304 and the second (or opposing) side 318 of the antenna 304 when viewed from a top of the antenna 304 and the grounded layer 302. The similar or equal amounts of grounded surface area exist (i) between a third edge 356 (perpendicular to the first edge 330) of the grounded layer 302 and the first dielectric area 314 on the first side 312 of the antenna 304, and (ii) between the slit 306 and the second dielectric area 316 on the second side 318 of the antenna 304.

Grounded surface areas 310, 320 are shown and are referred to as active areas through which a majority of current flows. Dashed lines 360, 362 along sides of the surfaces areas 310, 320 are provided to indicate example transitions between the active areas 310, 320 and a non-active area 364 of the grounded layer 302 with respect to current transmitted to or from the antenna 304. The dashed lines 360, 362 may be in different locations than shown and are provided as representative examples. The active areas 310, 320 are bordered by: edges 330, 356; dielectric regions 314, 316; transition areas and/or lines 360, 362; and the slit 306.

Figure 9:
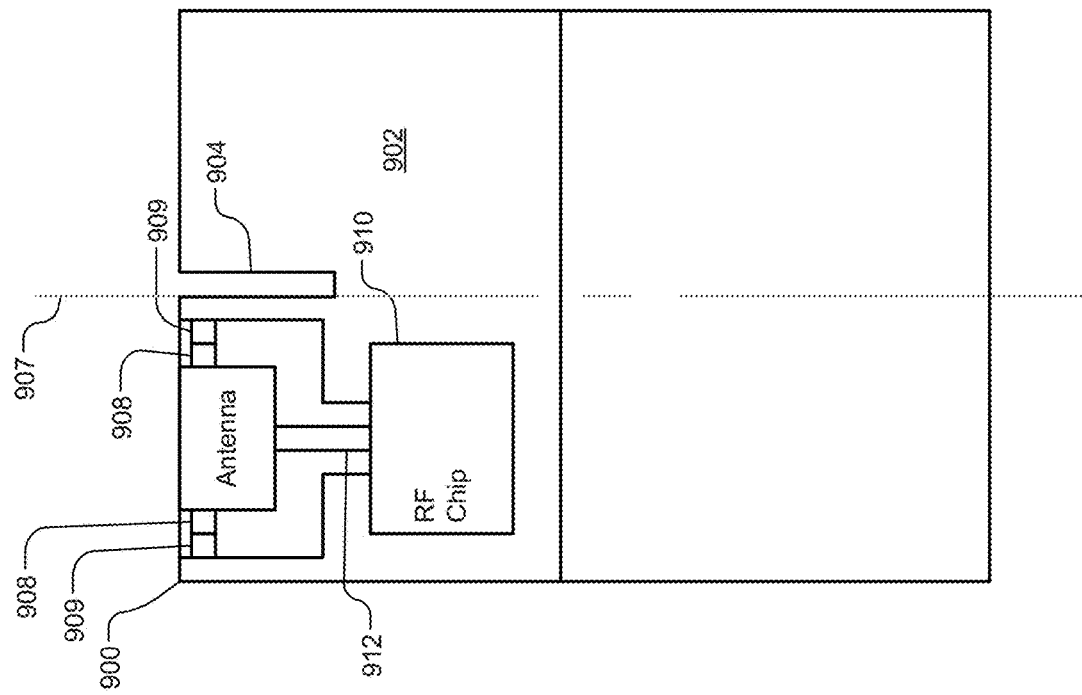
FIG. 9 is a top view if a slitted PCB including slitted grounded layers and an antenna that is edge-mounted and offset with grounded mounting pads in accordance with the present disclosure.

The first side 312 and the second side 318 of the antenna 304 may extend parallel to the centerline 305 and/or refer to sides of the antenna 304 along which the transmission line 350 is not connected. The similar and/or equal amounts of grounded surface area on the first and second sides 312, 318 of the antenna 304 provide a balanced structure, which results in the antenna 304 performing more like an omnidirectional antenna. The slit 306 and other slits disclosed herein cut off and decouple respective portions of corresponding grounded layers to equalize an amount of grounding on opposite sides of an antenna (e.g., the antenna 304). With equalized grounded areas on opposite sides of the antenna and slit lengths greater than or equal to predetermined thresholds, the occurrences of nulls in radiation patterns of the antennas is negligible. The radiation patterns may be two-dimensional or three-dimensional, depending on the type and style of the antenna. The antennas may be stamped antennas, PCB traces, molded and plated antennas, ceramic chip antennas, surface mounted antennas, through hole mounted antennas, electromagnetic wave or patch type antenna, and/or other types of antennas. In an embodiment, the antenna 304 is not shorted to ground. In another embodiment, the antenna 304 is shorted to ground via, for example, mounting pads and/or connecting pads, as shown in FIG. 9.

Although the antenna 304 and the other antennas disclosed herein are shown as rectangular objects, the antennas may have various shapes and sizes and be of various different types. Each of the antennas may include a flat electrode, a circular structure, a three-dimensional structure, a helical (or helix-shaped) structure, a cylindrical structure, etc. Although the antennas are shown as being edge mounted, the antennas may be offset from an edge a predetermined distance. In at least one embodiment, this offset distance is minimized. The term edge mounted may refer to an edge and/or a side of an antenna being in a vertical reference plane extending parallel to an edge of a ground layer and/or a PCB, as shown in FIGS. 1-3 and 8-9. When edge mounted, no grounded area of a grounded layer on which an antenna is mounted exists on a side of the antenna adjacent to the edge of that grounded layer. In one embodiment, the grounded layers and areas referred to herein may be connected to a true ground reference.

Because of how the RF signals are transmitted via the transmission line 350, the grounded areas between the antenna 304 and the RF chip are typically inactive (or zero current areas) or minimally active (or near-zero current areas) and thus are not relevant with respect to the radiation pattern of the antenna 304. Also, since the antenna 304 is edge mounted, a grounded area does not exists on an opposite side of the antenna 304. Thus, the grounded areas of interest are the areas 310 and 320, which are the active (or non-current areas), which may be at a high-frequency. It is a transition point where the transmission line 350 connects to the antenna 304, where the effects of the ground layer 302 on the radiation pattern of the antenna 304 change and the sizes, shapes and locations of the grounded areas 310, 320 are relevant. In at least one embodiment, and because of the disclosed arrangement, only a single slit is need to balance the grounding on sides of the antenna 304.

Figure 5:
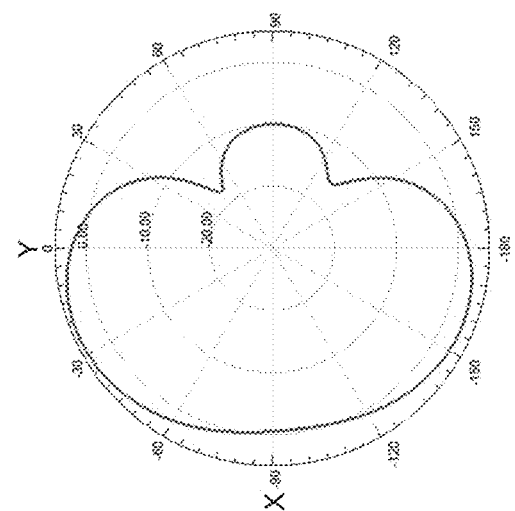
FIG. 5 is a plot illustrating an example radiation pattern of the antenna of FIG. 2.
Figure 4:
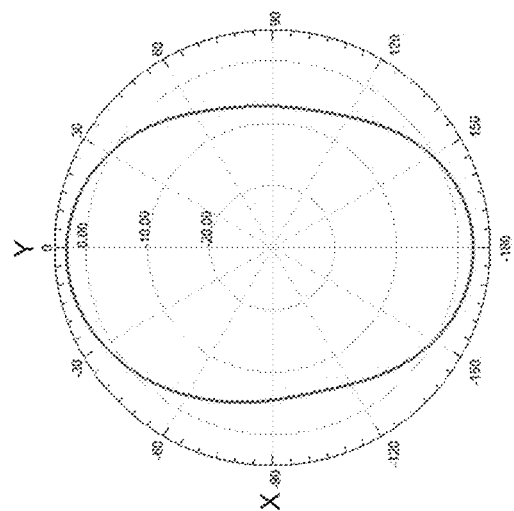
FIG. 4 is a plot illustrating an example radiation pattern of the antenna of FIG. 1.

FIG. 4 shows a plot illustrating an example radiation pattern of the antenna 102 of FIG. 1, as viewed from a top of the antenna 102. As shown, the radiation pattern is substantially symmetrical in X and Y directions. FIG. 5 shows a plot illustrating an example radiation pattern of the antenna 202 of FIG. 2, as viewed from a top of the antenna 202. As shown, the radiation pattern is not symmetrical about the Y-axis due to the unbalanced amount of grounded surface areas on opposing sides of the antenna 202, as described above. FIG. 6 shows a plot illustrating an example radiation pattern of the antenna 304 of FIG. 3, as viewed from a top of the antenna 304. As shown, the radiation pattern is more symmetrical about the Y-axis than the radiation pattern shown in FIG. 5 for the antenna 202 of FIG. 2. Thus, the arrangement of FIG. 3 allows the antenna 304 of FIG. 3 to perform more omni-directional than the arrangement of FIG. 2.

FIG. 7 shows the PCB 300 including one or more component layers; a first component layer 700 and a second component layer 702 are shown. The component layers 700 and 702 may be on opposite sides of a stack 704, which includes conductive (or grounded) layers and dielectric layers. As shown, a first conductive (or grounded) layer 706 is disposed below the first component layer 700 followed by a first dielectric layer 708. A second conductive (or grounded) layer 710 is disposed below the first dielectric layer 708 followed by a second dielectric layer 712. This pattern may be repeated any number of times followed by a bottommost conductive (or grounded) layer 714 that is disposed below a bottommost dielectric layer and above the second component layer 702.

The first component layer 700 may include the antenna 304. The first grounded layer 706 may include the transmission line 350 and is slitted as shown in FIG. 3 and thus includes the slit 306 adjacent the centerline 305. The slit may extend through the layers of the stack 704. The second grounded layer 710 includes the ground line 720 extending below the transmission line 350. The first dielectric layer 722 may be disposed between the transmission line 350 and the grounded line 720. The dielectric area 354 is shown on sides of the transmission line 350 between the grounded surface areas 310, 320 and corresponding portions of the grounded layer 706. The transmission line 350 may be connected to the antenna directly or via a conductive element (or connector) 730.

Each of the grounded layers 706, 710, 714 include conductive material, such as copper or other suitable conductive material. The dielectric layers 708, 712 and any other dielectric layers in the stack 704, the dielectric line 722, and the material in the dielectric areas 354 and 732 include non-conductive material, such as a polymer and/or other suitable dielectric material. The dielectric area 732 may be disposed on sides of the ground line 720. Dielectric material fills spaces between grounded areas (or conductive elements) in a sample plane and/or layer. For example, the dielectric areas 354 are disposed between the grounded surfaces areas 310, 320 and the transmission line 350. The layers in the stack 704 including the dielectric layers 708, 712 and the conductive layers 710, 714 include vias, some of which are shown and designated 730, which may be used to provide interconnections between components, conductive elements, and/or conductive layers.

The vias 730 may be filled and plated cylindricall-shaped holes that are conductive and electrically connect to the conductive material in the conductive layers of the stack 704. The vias 730 are shown for example purposes and do not include all of the vias in the stated layers. Conductive vias may be connected to the grounded areas 310, 320. The conductive vias may connect the grounded areas 310, 320 to a grounded layer and/or ground reference and are included to ensure that the grounded areas 310, 320 are at the same or similar voltage potentials at any moment in time. Tops of some example vias are shown in FIG. 8 and may be included in other substrates disclosed herein.

The RF chip 340 of FIG. 3 is not shown in FIG. 7, but may be disposed in the first component layer 700 or in the second component layer 702. If the RF chip 340 is in the first component layer 700, the transmission line 350 may be connected directly to the RF chip 340 or via a conductive element (or connector). If in the second component layer 702, a conductive via and/or element may be included in each layer of the stack 704 to connect the RF chip 340 to an end of the transmission line 350 opposite the antenna 304. In one embodiment, the antenna 304 is included in the second component layer 702 and the RF chip is included in one of the component layers 700, 702. The component layers 700, 702 may include other components, such as control modules, access modules, etc., some of which are referred to below.

The component layers 700, 702 may extend over the outermost (topmost and/or bottommost) grounded layers and/or over the substrates referred to herein. As an example, the substrates may be implemented as epoxy glass substrates. One or more of the components in the component layers 700, 702 may be mounted over one of the substrates and not over the corresponding outermost grounded layer. Each of the substrates may extend across entire horizontal (or lateral) areas of the substrates and include a stack of dielectric and grounded layers. Although the uppermost grounded layers shown in FIGS. 1-3 and 8-9 are shown covering only a certain portion of the lateral (or horizontal) surface area of the substrates, the uppermost grounded layers may extend over the entire lateral surface area of the substrates or a different portion thereof than shown in FIGS. 1-3 and 8-9. In FIGS. 1-3 and 8-9, the uppermost grounded layers are shown having three side edges extending along parallel to and is same vertical reference planes as three side edges of the corresponding substrates. The fourth side edges of the uppermost grounded layers extend across a middle of the substrates and first dielectric layers.

Figure 8:
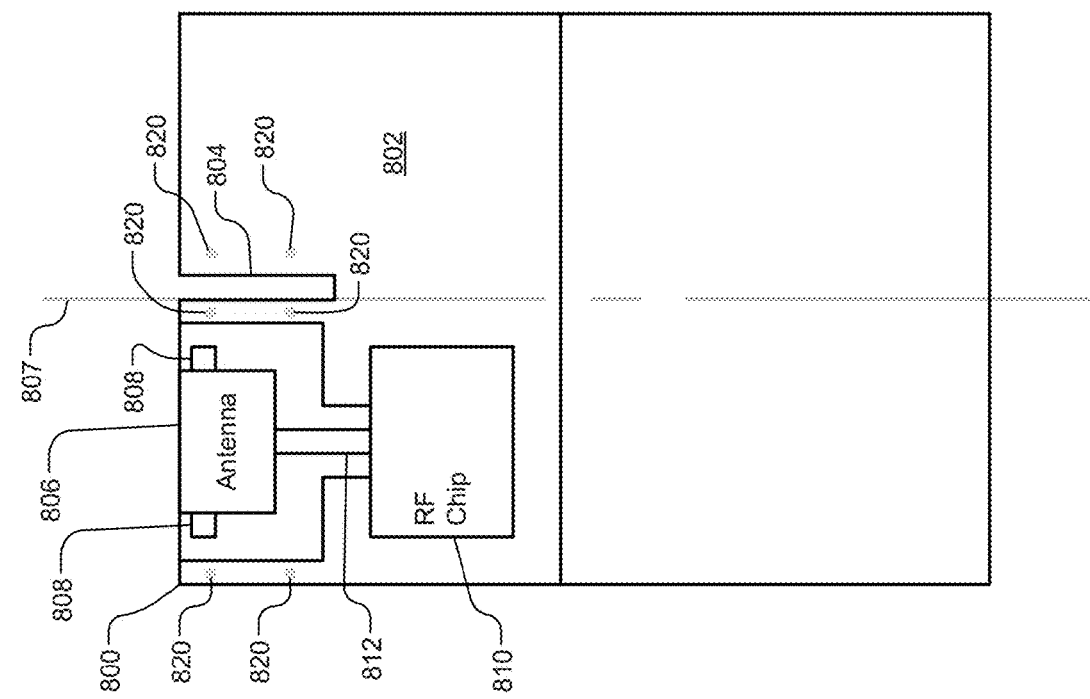
FIG. 8 is a top view if a slitted PCB including slitted grounded layers and an antenna that is edge-mounted and offset with mounting pads in accordance with the present disclosure.

FIG. 8 shows a PCB 800 including a grounded layer 802 including a slit 804. An antenna 806 is edge-mounted and offset from a centerline 807 of the grounded layer 802 and/or the PCB 800. The antenna 806 may be mounted to the PCB 800 by mounting pads 808. The mounting pads 808 may be provided for antenna mechanical stability. The mounting pads 808 may be ceramic pads. The antenna 806 receives signals from and transmits signals to an RF chip 810 via a transmission line 812. The PCB 800 may be configured similarly as the PCB 300 of FIGS. 3 and 7.

Some example vias 820 are shown and are included to ensure that the grounded areas 822, 824 and 826 are connected to a ground reference and are at the same voltage potential or within a predetermined range of each other at any moment in time. The vias 820 are connected to the grounded areas 822, 824 and 826 on opposing sides of the antenna 806 and on opposing sides of the slit 804.

FIG. 9 shows a PCB 900 including a grounded layer 902 including a slit 904. An antenna 906 is edge-mounted and offset from a centerline 907 of the grounded layer 902 and/or the PCB 900. The antenna 906 may be mounted to the PCB 900 by mounting pads 908 that are grounded by ground connecting elements 909 that connect the pads 908 to the grounded layer 902. The mounting pads 908 may be provided for antenna mechanical stability and the ground connecting elements 909 may be provided for RF integrity. The mounting pads 908 may be ceramic pads. The antenna 906 receives signals from and transmits signals to an RF chip 910 via a transmission line 912. The PCB 900 may be configured similarly as the PCB 300 of FIGS. 3 and 7.

Although the above-described slitted structures aid in providing more omni-directional like performance, the radiation patterns of the corresponding antennas in actual implementation may not be spherical, but rather may be more planar and/or have a toroidal shape if not spherically polarized. The antennas and corresponding slitted supporting structures disclosed herein are applicable for transmitted various RF signals including Bluetooth® and ultra-wideband (UWB) signals, as well as other RF signals.

As an example, a key fob with no low frequency function (e.g., communication over low frequencies, such as 125 kHz) may send a Bluetooth® low-energy (BLE) message periodically to ensure a connection with a vehicle while approaching the vehicle. The BLE message may be referred to as an advertisement. An advertisement period at which BLE messages are transmitted can be set to ensure that the key fob is connected prior to entering an unlock zone. An unlock zone refers to a zone in which the vehicle is passively unlocked, meaning the vehicle unlocks doors without user interaction with the key fob and the vehicle. When the key fob is connected and authenticated and within the unlock zone, the vehicle unlocks the doors.

A PAK system may include multiple ultra-wideband (UWB) sensors installed throughout a vehicle and one or more Bluetooth® low-energy (BLE) nodes (e.g., BLE transceivers and antennas). The BLE nodes are also implemented in the vehicle and used to wake up a mobile access device (e.g., a key fob, a mobile phone, a wearable device, etc.). The UWB sensors are used to precisely determine the location of the mobile access device relative to the vehicle. As further described herein, when determining a location of a mobile access device, it is determined whether the mobile access device is in or outside of one or more predefined zones relative to the corresponding vehicle. The predefined zones may include one or more zones internal or external to the vehicle. The internal zones may include one or more zones within a cabin of the vehicle and/or in other areas of the vehicle, such as in a trunk or tail gate space of the vehicle.

Figure 10:
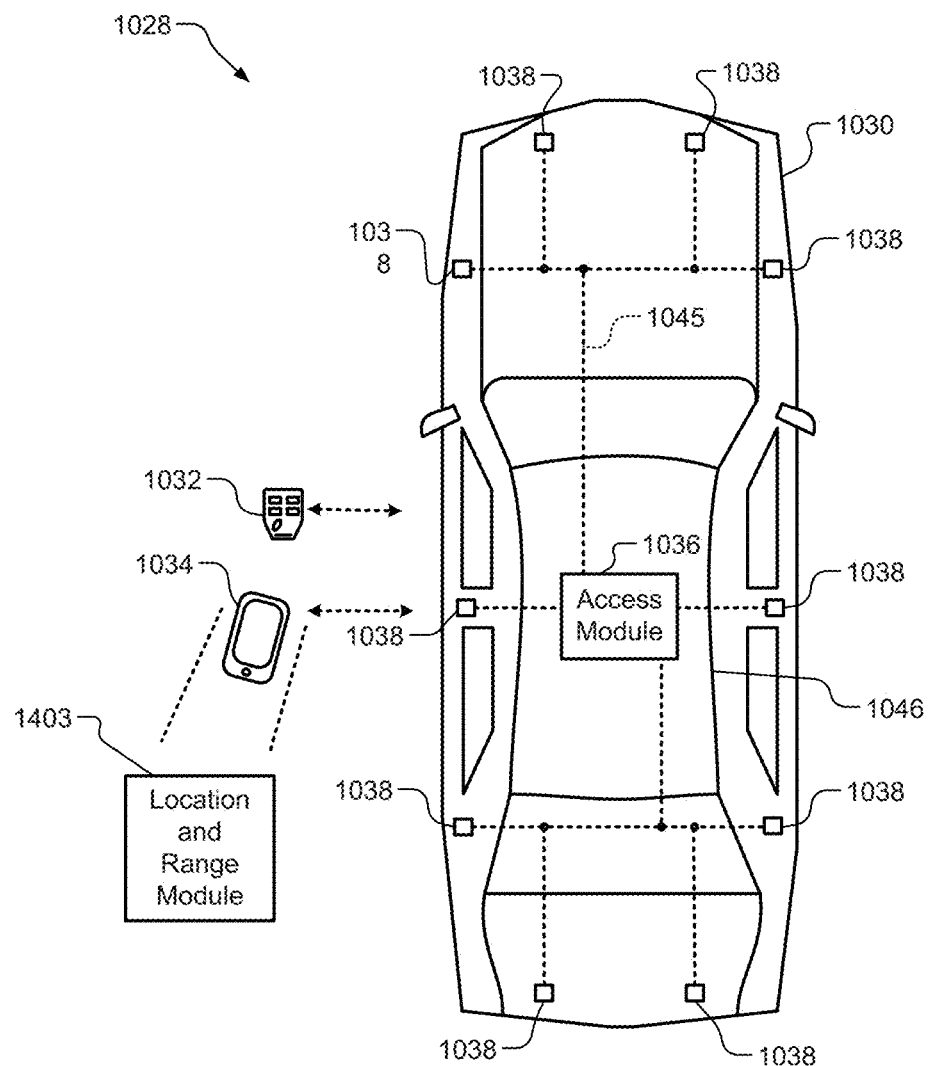
FIG. 10 is a functional block diagram of an example of a vehicle access system including a vehicle and mobile access devices with antenna supporting structures in accordance with the present disclosure.

FIG. 10 shows a vehicle access system 1028 including a vehicle 1030 and mobile access devices 1032, 1034. Each of the vehicle 1030 and the access devices 1032, 1034 may include any one of the antennas and corresponding supporting structures and RF circuits shown in FIGS. 1-3 and 7-9.

The vehicle access system 1028 performs as a PEPS system and a PAK system. The vehicle access system 1028 includes the vehicle 1030 and may include the key fob 1032, the mobile phone 1034, and/or other portable (or mobile) access devices, such as a wearable device, a laptop computer, or other portable network device. The mobile access devices may be, for example, a Bluetooth®-enabled and UWB-enabled communication device, such as a smart phone, smart watch, wearable electronic device, key fob, tablet device, or other device associated with a user of the vehicle 1030. The user may be an owner, driver, or passenger of the vehicle 1030 and/or a technician for the vehicle 1030.

The vehicle 1030 includes an access module 1036 and antenna modules 1038. One or more of the antenna modules 1038 may be included in the access module 1036. As an example, the antenna modules 1038 may each be implemented as one or more antennas, such as one of the antennas and corresponding supporting structures shown in FIGS. 1-3 and 7-9. The access module 1036 may wirelessly transmit and receive BLE and/or UWB signals via the antenna modules 1038 including wirelessly communicating with the portable access devices. As an example, the UWB signals may be spread over a large bandwidth of greater than 500 Mega-Hertz (MHz). The BLE and/or UWB signals may be transmitted to and/or received from the portable access devices and used to connect with and track a location and movement of the portable access devices. Although particular numbers of antenna modules 1038 are shown, any number of each may be utilized. The access module 1036 may communicate with some of the antenna modules 1038 wirelessly and/or via a vehicle interface 1045. As an example, the vehicle interface 1045 may include a controller area network (CAN) bus, a local interconnect network (LIN) for lower data-rate communication, a clock extension peripheral interface (CXPI) bus and/or one or more other vehicle interfaces.

The antenna modules 3108 may be at various locations on the vehicle and transmit and receive high frequency RF (e.g., BLE) signals and/or UWB signals. Each of the antenna modules 1038 includes a RF (or BLE) and/or UWB antenna and may include a control module and/or other circuitry for RF (or BLE) and/or UWB signal transmission. The antenna modules 1038 may transmit BLE signals according to BLE communication protocols. Alternatively, the antenna modules 1038 may communicate according to other wireless communication protocols, such as wireless fidelity (Wi-Fi) using the stated antennas and antenna structures. In one embodiment and to improve signal coverage relative to the vehicle and improve transmission and reception characteristics, the antenna modules 1038 are located in a roof 1046 of the vehicle 1030.

Figure 11:
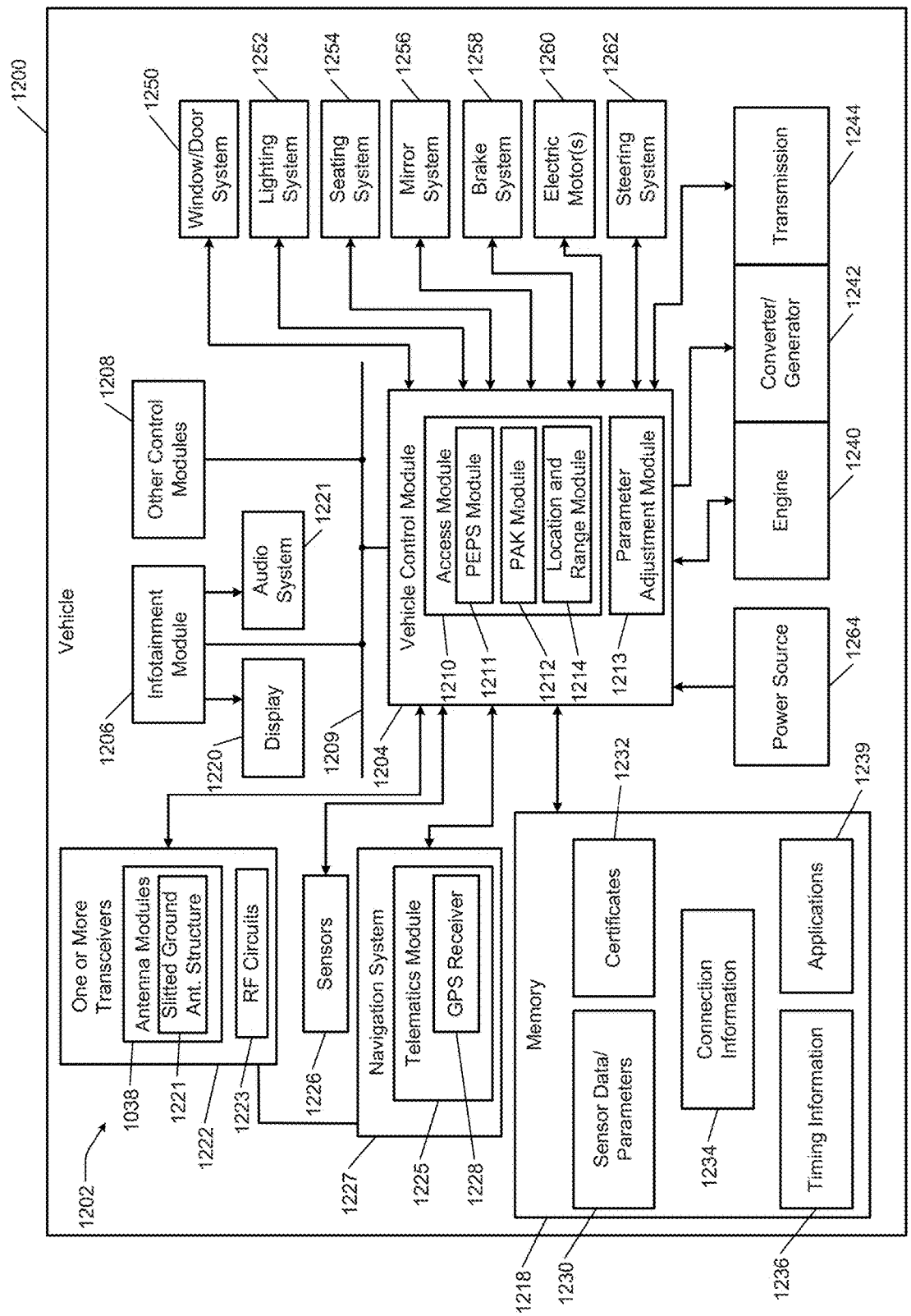
FIG. 11 is a functional block diagram of an example of a vehicle including at least one antenna supporting structure and an access module in accordance with the present disclosure.
Figure 12:
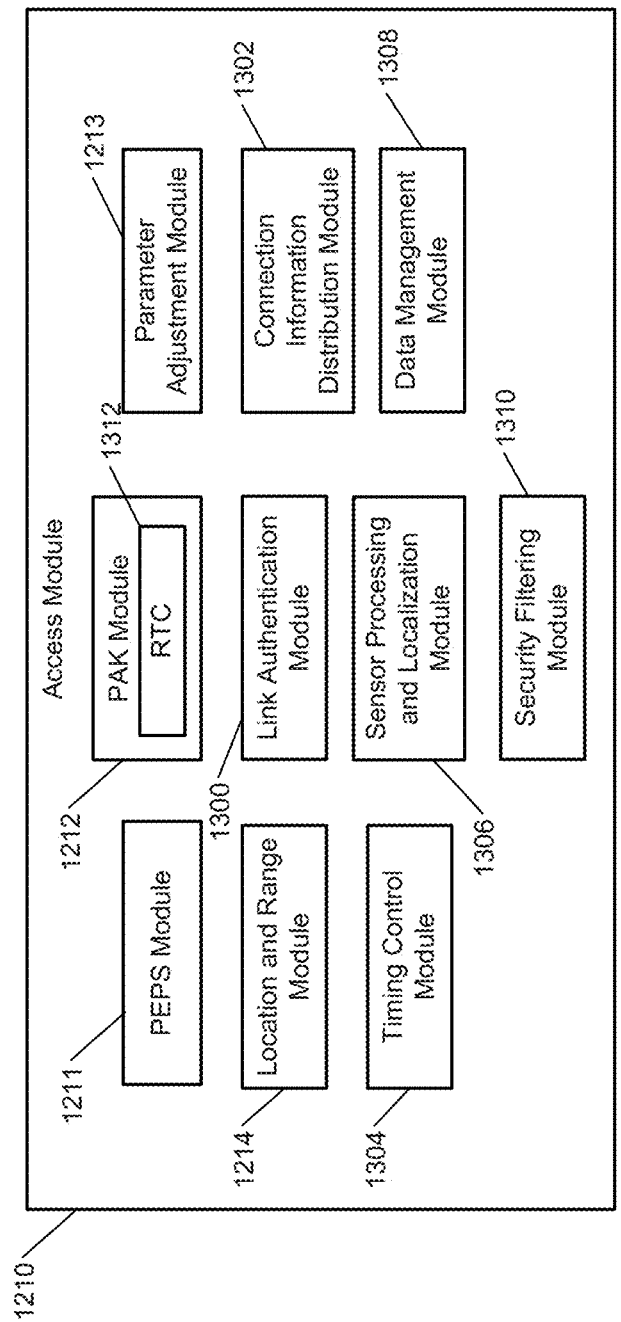
FIG. 12 is a functional block diagram of an example of the access module of FIG. 11 in accordance with the present disclosure.

FIG. 11 shows a vehicle 1200 including at least one antenna and supporting structure, such as one of the antennas and corresponding supporting structures shown in FIGS. 1-3 and 7-9, and an access module. The vehicle 1200 is an example of the vehicle 1030 of FIG. 1. The vehicle 1200 includes a PAK system 1202, which includes a vehicle control module 1204, an infotainment module 1206 and other control modules 1208 (e.g., a body control module). The modules 1204, 1206, 1208 may communicate with each other via a bus 1209 and/or other vehicle interface (e.g., the vehicle interface 1045 of FIG. 1). As an example, the bus 1209 may include a controller area network (CAN) bus, a local interconnect network (LIN) for lower data-rate communication, a clock extension peripheral interface (CXPI) bus and/or one or more other vehicle interfaces. The vehicle control module 1204 may control operation of vehicles systems. The vehicle control module 1204 may include an access module 1210, a PEPS module 1211, a PAK module 1212 a parameter adjustment module 1213 and a location and range response module 1214, as well as other modules, some of which are shown in FIG. 12. FIG. 11 is an example of when an access module (e.g., the access module 1210) is implemented as a separate module from the antenna modules 1038 and transceivers 1222. The transceivers 1222 include BLE and UWB transceivers. The antenna modules 1038 may each include a slitted antenna structure 1221, such as that shown in FIGS. 1-3 and 7-9. The vehicle control module 1204 may also include one or more processors that are configured to execute instructions stored in a non-transitory computer-readable medium, such as the memory 1218, which may include read-only memory (ROM) and/or random access memory (RAM).

The PEPS module 1211 may perform PEPS operations to provide access to an interior of the vehicle and permit starting and/or operation of the vehicle. Starting the vehicle may refer to powering ON devices of the vehicle, starting an internal combustion engine, starting a motor of the vehicle, and/or starting other operations of the vehicle. The PAK module 1212 operates in cooperation with the PEPS module 1211 and performs PAK operations as described herein. The PEPS module 1211 may include the PAK module 1212 or the modules 1211, 1212 may be implemented as a single module. The parameter adjustment module 1213 may be used to adjust parameters of the vehicle 1200. The location and range module 1214 generates range response signals for range determinations. The location and range module 1214 determines wait periods between range requests based on distances between mobile access devices and the vehicle 1200. These features are further described below.

The PAK system 1202 may further include: a memory 1218; a display 1220; an audio system 1221; and one or more transceivers 1222 including the antenna modules 1038. The antenna modules 1038 may include and/or be connected to RF circuits 1223. The PAK system 1202 may further include: a telematics module 1225; sensors 1226; and a navigation system 1227 including a global positioning system (GPS) receiver 1228. The RF circuits 1223 may be used to communicate with a mobile device (e.g., the mobile device 32 or 34 of FIG. 1) including transmission of Bluetooth® signals in a 2.4 giga-Hertz (GHz) band, signals in an 8 GHz band, ultra-wideband signals, and/or other RF signals. The RF circuits 1223 may include BLE radios, transmitters, receivers, etc. for transmitting and receiving RF signals.

The one or more transceivers 1222 may include a RF transceiver including the RF circuits 1223 and implement an access application having code to inspect timestamped data received and transmitted by the antenna modules 1038. The access application may confirm whether the antenna modules 1038 have, for example, received correct data at the correct time. The access application may be stored in the memory 1218 and implemented by the PEPS module 1211 and/or the PAK module 1212. Other example operations of the access application are further described below.

The access application may implement a Bluetooth® protocol stack that is configured to provide a channel map, access identifier, next channel, and a time for a next channel. The access application is configured to output timing signals for timestamps for signals transmitted and received via the antenna modules 1038. The access application may obtain channel map information and timing information and share this information with other modules in the vehicle.

The telematics module 1225 may communicate with a server via a cell tower station. This may include the transfer of certificates, license information, and/or timing information including global clock timing information. The telematics module 1225 is configured to generate location information and/or error of location information associated with the vehicle 1200. The telematics module1 225 may be implemented by a navigation system 1227.

The sensors 1226 may include sensors used for PEPS and PAK operations, cameras, objection detection sensors, temperature sensors, accelerometers, vehicle velocity sensor, and/or other sensors. The sensors 1226 may include a touch sensor to detect, for example, a person touching a door handle to initiate a process of waking up a portable access device. The sensors 1226 may be connected to the other control modules 1208, such as the body control module, which may be in communication with LF and RF antenna circuits and/or modules disclosed herein. The GPS receiver 1228 may provide vehicle velocity and/or direction (or heading) of the vehicle and/or global clock timing information.

The memory 1218 may store sensor data and/or parameters 1230, certificates 1232, connection information 1234, timing information 1236, and applications 1239. The applications 1239 may include applications executed by the modules 1038, 1204, 1206, 1208, 11210, 1211, 1212, 1214, 1223 and/or transceivers 1222. As an example, the applications may include the access application, a PEPS application and/or a PAK application executed by the transceivers 1222 and the modules 1210, 1211, 1212 and/or 1214. Although the memory 1218 and the vehicle control module 1204 are shown as separate devices, the memory 1218 and the vehicle control module 1204 may be implemented as a single device. The single device may include one or more other devices shown in FIG. 11.

The vehicle control module 1204 may control operation of an engine 1240, a converter/generator 1242, a transmission 1244, a window/door system 1250, a lighting system 1252, a seating system 1254, a mirror system 1256, a brake system 1258, electric motors 1260 and/or a steering system 1262 according to parameters set by the modules 1204, 1206, 1208, 1210, 1211, 1212, 1213, 1214. The vehicle control module 1204 may perform PEPS and/or PAK operations, which may include setting some of the parameters. The PEPS and PAK operations may be based on signals received from the sensors 1226 and/or transceivers 1222. The vehicle control module 1204 may receive power from a power source 1264 which may be provided to the engine 1240, the converter/generator 1242, the transmission 1244, the window/door system 1250, the lighting system 1252, the seating system 1254, the mirror system 1256, the brake system 1258, the electric motors 1260 and/or the steering system 1262, etc. Some of the PEPS and PAK operations may include unlocking doors of the window/door system 1250, enabling fuel and spark of the engine 1240, starting the electric motors 1260, powering any of the systems 1250, 1252, 1254, 1256, 1258, 1262, and/or performing other operations as are further described herein.

The engine 1240, the converter/generator 1242, the transmission 1244, the window/door system 1250, the lighting system 1252, the seating system 1254, the mirror system 1256, the brake system 1258, the electric motors 1260 and/or the steering system 1262 may include actuators controlled by the vehicle control module 1204 to, for example, adjust fuel, spark, air flow, steering wheel angle, throttle position, pedal position, door locks, window position, seat angles, etc. This control may be based on the outputs of the sensors 1226, the navigation system 1227, the GPS 1228 and the above-stated data and information stored in the memory 1218.

FIG. 12 shows the access module 1210, which includes the PEPS module 1211, the PAK module 1212, the parameter adjustment module 1213, the location and range module 1214 and may further include a link authentication module 1300, a connection information distribution module 1302, a timing control module 1304, a sensor processing and localization module 1306, a data management module 1308 and a security filtering module 1310. The PAK module 1212 may include a real time clock (RTC) 1312 that maintains a local clock time.

The link authentication module 1300 may authenticate the portable access devices of FIG. 10 and establish the secure communication link. For example, the link authentication module 1300 can be configured to implement challenge-response authentication or other cryptographic verification algorithms in order to authenticate the portable access devices.

The connection information distribution module 1302 is configured to communicate with some of the sensors 1226 of FIG. 11 and provide the sensors with communication information necessary for the sensors to find and then follow, or eavesdrop on, the secure communication link. This may occur once the sensors are synchronized with a communication gateway, which may be included in or implemented by one of the transceivers 1222. As an example, the vehicle 1200 and/or the PAK system 1202 may include any number of sensors disposed anywhere on the vehicle 1200 for detecting and monitoring mobile devices. The connection information distribution module 1302 is configured to obtain information corresponding to communication channels and channel switching parameters of a communication link and transmit the information to the sensors 1226. In response to the sensors 1226 receiving the information from the connection information distribution module 1302 via a bus or other vehicle interface disclosed herein and the sensors 1226 being synchronized with the communication gateway, the sensors 1226 may locate and follow, or eavesdrop on, the communication link.

The timing control module 1304 may: maintain the RTC and/or currently stored date if not handled by the PAK module 1212; disseminate current timing information with the sensors; generate timestamps for incoming and outgoing messages, requests, signals, certificates, and/or other items; calculate round trip times; etc. A round trip time may refer to the amount between when a request is generated and/or transmitted and a time when a response to the request is received. The timing control module 1304 may obtain timing information corresponding to a communication link when the link authentication module 1300 executes challenge-response authentication. The timing control module 1304 is also configured to provide the timing information to the sensors 1226 via the vehicle interface 1209.

After link authentication is established, the data management module 1308 collects the current location of the vehicle 1200 from the telematics module 1225. The location and range module 1214 determines locations of the portable access devices relative to the vehicle 1200. This may include performing an exchange of UWB challenge signals to determine distances between the vehicle 1200 and the portable access devices. Based on the estimated distances between the portable access devices and the vehicle 1200, the portable access devices can wait determined periods of time, as described below prior to performing a subsequent exchange of UWB signals (referred to as a set of range request/response signals) to determine updated locations of the portable access devices.

The security filtering module 1310 detects violations of a physical layer and protocol and filter data accordingly before providing information to the sensor processing and localization module 1306. The security filtering module 1310 flags data as injected such that the sensor processing and localization module 1306 is able to discard data and alert the PEPS module 1211. The data from the sensor processing and localization module 1306 is passed along to the PEPS module 1211, whereby the PEPS module 1211 is configured to read vehicle state information from the sensors in order to detect user intent to access a feature and to compare the location of the mobile device to a set of locations that authorize certain vehicle features, such as unlocking a door or trunk of the vehicle and/or starting the vehicle.

Figure 13:
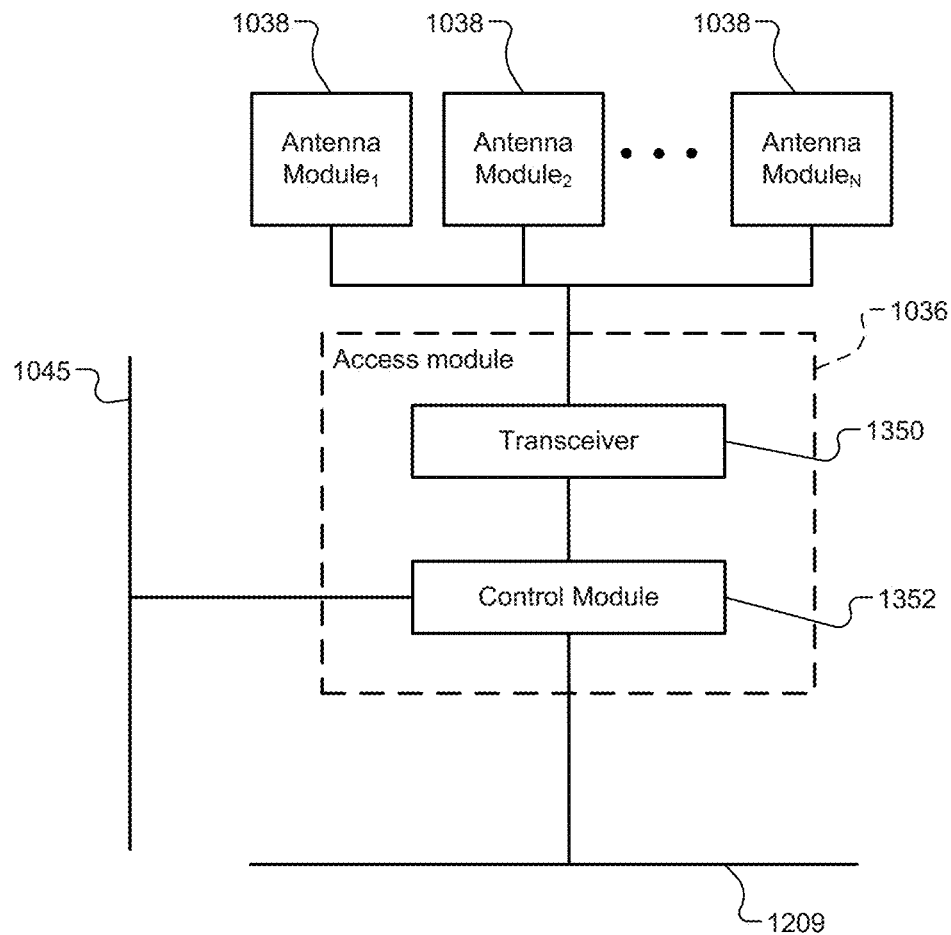
FIG. 13 is a functional block diagram of an example of antenna modules and the access module of FIG. 10.

FIG. 13 shows the access module 1036, which may include or be connected to one or more antenna modules 1038. The access module 1036 may include a transceiver 1350 and a control module 1352. The control module 1352 may be implemented similarly as the access module 1210 of FIGS. 11 and 12. The transceiver 1350 may be configured to transmit and/or receive RF, BLE and/or UWB signals. The control module 1352 may include or be part of a BLE communication chipset and/or include or be part of a Wi-Fi or Wi-Fi direct communication chipset. Some or all of the operations of the control module 1352 may be implemented by one or more of the modules 1204, 1210, 1211, 1212, 1214 of FIG. 11.

The control module 1352 (or one or more of the modules 1204, 1210, 1211, 1212 of FIG. 11) may establish a secure communication connection with a portable access device (e.g., one of the portable access devices 1032, 1034 of FIG. 10). For example, the control module 1352 may establish a secure communication connection using the BLE communication protocol this may include transmitting and/or receiving timing and synchronization information. The timing and synchronization information may include information directed to the secure communication connection, such as timing of next communication connection events, timing intervals between communication connection events, communication channels for next communication connection events, a channel map, a channel hop interval or offset, communication latency information, communication jitter information, etc. The control module 1352 may detect (or "eavesdrop") packets sent by the portable access device to the vehicle control module 1204 and measure signal information of the signals received from the portable access device. The channel hop interval or offset may be used to calculate a channel for a subsequent communication connection event.

The control module 1352 may measure a received signal strength of a signal received from the portable access device and generate a corresponding RSSI value. Additionally or alternatively, the control module 1352 may take other measurements of transmitted and received signals from the portable access device, such as an angle of arrival, a time of flight, a time of arrival, a time difference of arrival, etc. As an example, time of flight calculations may be made to measure time of flight of UWB signals. The control module 1352 may then send the measured information to the vehicle control module 1204, which may then determine a location of and/or distance to the portable access device relative to the vehicle 1030 based on the measured information. The location and distance determinations may be based on similar information received from one or more other antenna modules and/or other sensors.

As an example, the vehicle control module 1204 may determine the location of the portable access device based on, for example, the patterns of the RSSI values corresponding to signals received from the portable access device by the antenna modules 1038. A strong (or high) RSSI value indicates that the portable access device is close to the vehicle 1030 and a weak (or low) RSSI value indicates that the portable access device is further away from the vehicle 1030. By analyzing the RSSI values, the control module 1204 may determine a location of and/or a distance to the portable access device relative to the vehicle 1030. Additionally or alternatively, angle of arrival, angle of departure, round trip timing, unmodulated carrier tone exchange, or time difference of arrival measurements for the signals sent between the portable access device and the control module 1204 may also be used by the control module 1204 or the portable access device to determine the location of the portable access device. Additionally or alternatively, the antenna modules 1038 may determine the location of and/or distance to the portable access device based on the measured information and communicate the location or distance to the control module 1204.

Based on the determined location of or distance to the portable access device relative to the vehicle 1030, the modules 1211, 1212 of FIGS. 11-12 may then authorize and/or perform a vehicle function, such as unlocking a door of the vehicle 1030, unlocking a trunk of the vehicle 1030, starting the vehicle 1030, and/or allowing the vehicle 1030 to be started. As another example, if the portable access device is less than a first predetermined distance from the vehicle 1030, the modules 1211, 1212 may activate interior or exterior lights of the vehicle 1030. If the portable access device is less than a second predetermined distance from the vehicle 1030, the modules 1211, 1212 may unlock doors or a trunk of the vehicle 1030. If the portable access device is located inside of the vehicle 1030, the modules 1211, 1212 may allow the vehicle 1030 to be started. Based on the determined location of or distance to the portable access device relative to the vehicle 1030, access module 1036 and/or range module 1214 may also perform certain operations as further described below.

Figure 14:
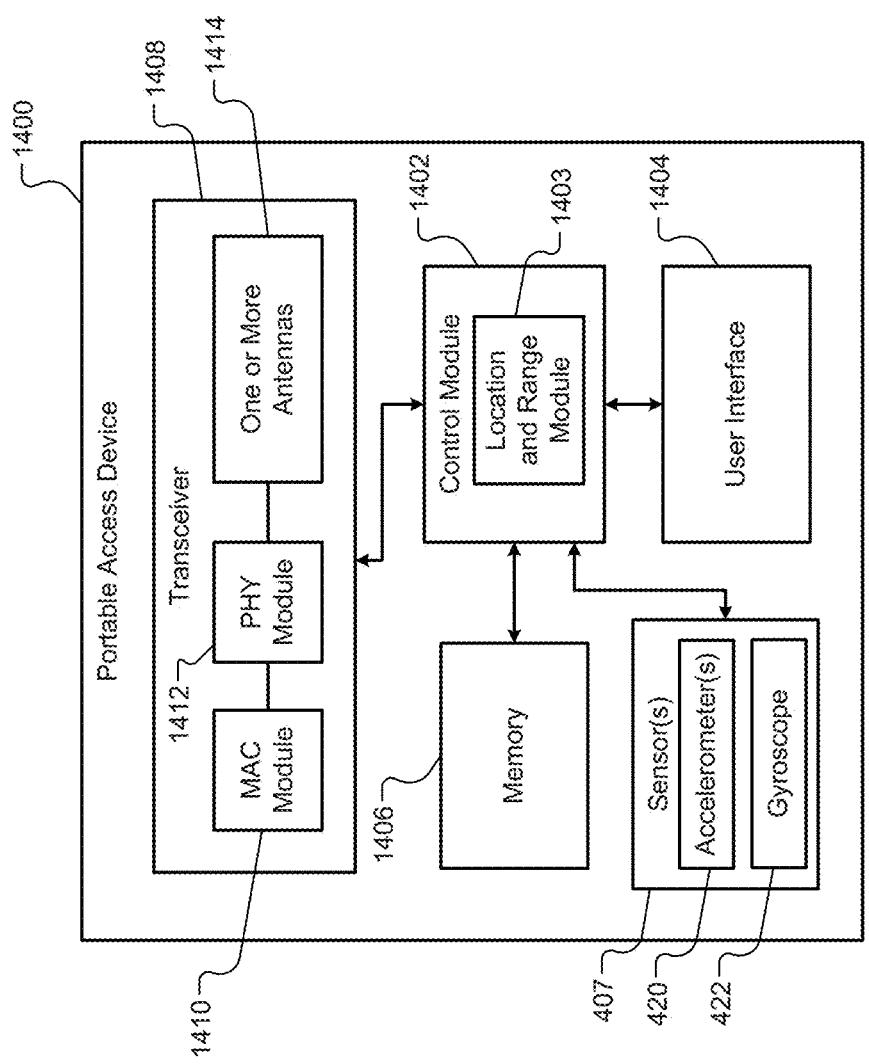
FIG. 14 is a functional block diagram of an example of a portable network device including a location and range module in accordance with the present disclosure.

FIG. 14 shows a portable network device 1400 including a location and range module 1403 and one or more of the antennas and supporting structure shown in FIGS. 1-3 and 7-9. The portable (or mobile) access device 1400 is an example of each of the portable access devices 1032, 1034 of FIG. 10. The portable access device 1400 may include a control module 1402, a user interface 1404, a memory 1406, sensors 1407 and a transceiver 1408. The transceiver 1408 may include a MAC module 1410, a PHY module 1412 and one or more antennas 1414, such as one or more of the antennas shown in FIGS. 1-3 and 7-9.

The control module 1402 may include or be part of a BLE and/or UWB communication chipset. Alternatively, the control module 1402 may include or be part of a Wi-Fi or Wi-Fi direct communication chipset. The memory 1406 may store application code that is executable by the control module 1402. The memory 1406 may be a non-transitory computer-readable medium including read-only memory (ROM) and/or random-access memory (RAM).

The control module 1402 may include the location and range module 1403 (also shown in FIG. 1) and communicate with the vehicle control module 1204 of the vehicle and performs authentication and other operations as further described below. The range module 1403 may perform a UWB signal exchange with the range module 1214 of FIG. 2 to allow the vehicle to determine a location of the portable access device 1400. In alternative embodiment, the vehicle control module 1204 reports the location of the vehicle to the portable access device 1400 and the location and range module 1403 determines, based on the location of the portable access device 1400 and the location of the vehicle, distance between the portable access device 1400 and the vehicle. Single sided ranging, double sided ranging, time-of-flight determining, round trip time determining, etc. may be performed to determine distances between portable access devices and a vehicle.

The control module 1402 may transmit information regarding the portable access device 1400, such as location, heading and/or velocity information obtained from one or more of the sensors 1407 (e.g., a global navigation satellite system (e.g., GPS) sensor, an accelerometer, a gyroscope, and/or an angular rate sensor). In the example shown, the sensors 1407 include one or more accelerometers 1420 and/or a gyroscope 1422. In another embodiment, the gyroscope 1422 is not utilized. The user interface 1404 may include a key pad, a touch screen, a voice activated interface, and/or other user interface.

Figure 15:
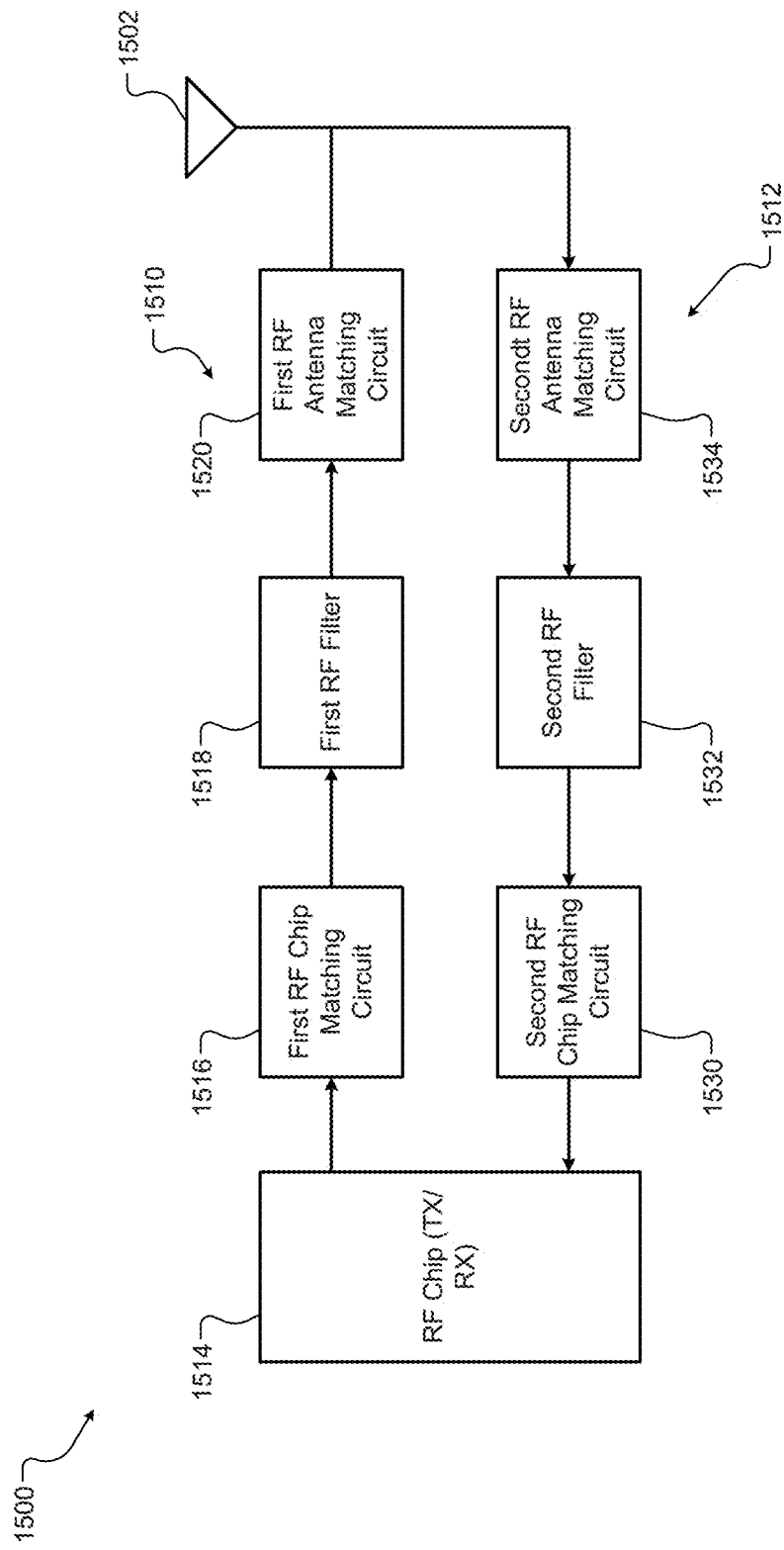
FIG. 15 is a functional block diagram of an example of a transceiver circuit and an antenna with an antenna supporting structure in accordance with the present disclosure.

FIG. 15 shows a transceiver circuit 1500 and an antenna 1502. The antenna 1502 may refer to any of the antennas disclosed herein and have an antenna structure such as that shown and/or described with respect to FIGS. 1-3 and 7-9. The transceiver circuit 1500 may be implemented as part of the transceivers 1222 of FIG. 11, the transceiver 1350 of FIG. 13, the transceiver 1408 of FIG. 14, and/or other transceiver of the vehicles and access devices disclosed herein. The transceiver circuit 1500 may include a transmit path 1510 and a receive path 1512. The transmit path 1510 may include a RF chip 1514, a first RF chip matching circuit 1516, a first RF filter 1518 and a first RF antenna matching circuit 1520. The receive path 1512 may include the RF chip 400, a second RF chip matching circuit 1530, a second RF filter 1532 and a second RF antenna matching circuit 1534.

The RF chip 1514 converts a baseband signal to an RF signal (e.g., an 8 GHz signal) for transmission and converts a received RF signal (e.g., an 8 GHz signal) to a baseband signal for reception. The first RF chip matching circuit 1516 provides impedance matching between the RF chip 1514 and the portion of the RF circuit 1500 downstream from the first RF chip matching circuit 1516. The first RF filter 1518 may perform as a bandpass filter (or pass band filter) and reject transmission of any out of band radiation including second and/or higher order harmonics. The first RF antenna matching circuit 1520 provides impedance matching between the antenna 1502 and the portion of the RF circuit 1500 upstream from the first RF antenna matching circuit 1520.

The second RF chip matching circuit 1530 provides impedance matching between the RF chip 1514 and the portion of the RF circuit 1500 upstream from the second RF chip matching circuit 1530. The second RF filter 1532 may perform as a bandpass filter (or pass band filter) and reject reception of any out of band radiation including second and/or higher order harmonics. The second RF antenna matching circuit 1534 provides impedance matching between the antenna 1502 and the portion of the RF circuit 1500 downstream from the second RF antenna matching circuit 1534. The supporting structure of the antenna 1502 may be provided between the matching circuits 1520, 1534 and the antenna 1502.

Output(s) and input(s) of the RF chip 1514 may be 50 ohms or have some other impedances. The RF chip matching circuits 1516 and 1530 may be included to match to the impedances of the output(s) and input(s). Similarly, the impedance of the antenna 1502 may not be a set fixed impedance and the antenna matching circuits 1520, 1534 may be included to match to the impedance of the antenna 1502.

Figure 16:
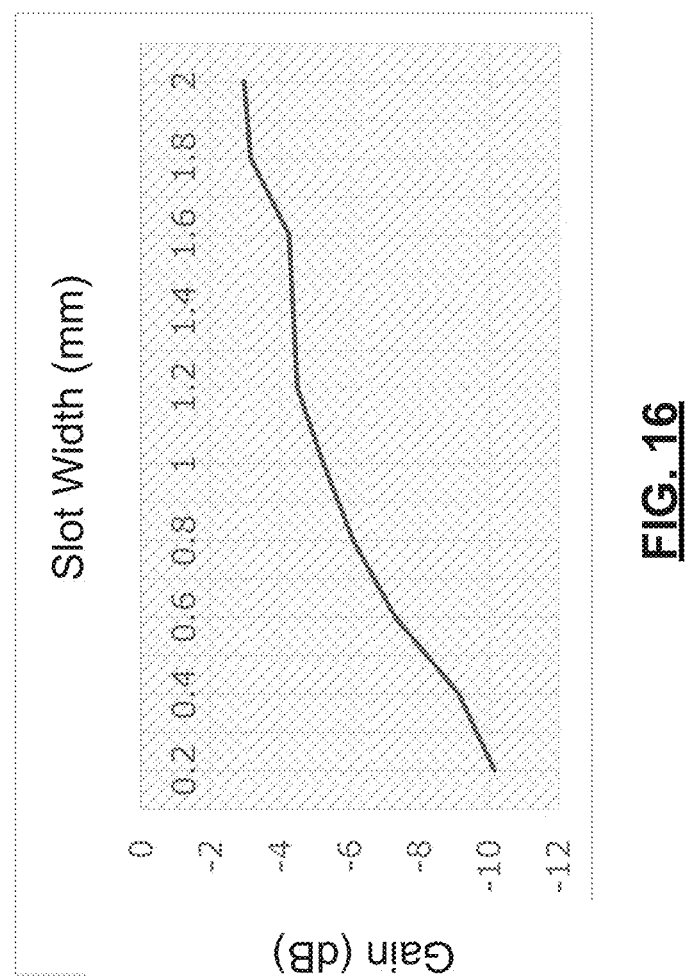
FIG. 16 is an example plot of slot width versus gain for an antenna arranged on an antenna supporting structure in accordance with the present disclosure.

FIG. 16 shows an example plot of slot width W5 versus gain for an antenna arranged on an antenna supporting structure, such as one of the antenna disclosed herein. For this example, the effective wavelength $\lambda_{\mathit{eff}}/10$ is equal to 2.14 millimeters (mm) for a 7 GHz RF signal. The slot width W5 may be greater than $\lambda_{\mathit{eff}}/10$. Further increasing the slot width enhances performance, but is limited as PCB grounded layer area is used for other electronic components. Also, the enhanced performance is minimal for slot widths greater than 2 mm. The slot width is a frequency dependent parameter and thus depends on the operating frequency band of the antenna.

Figure 17:
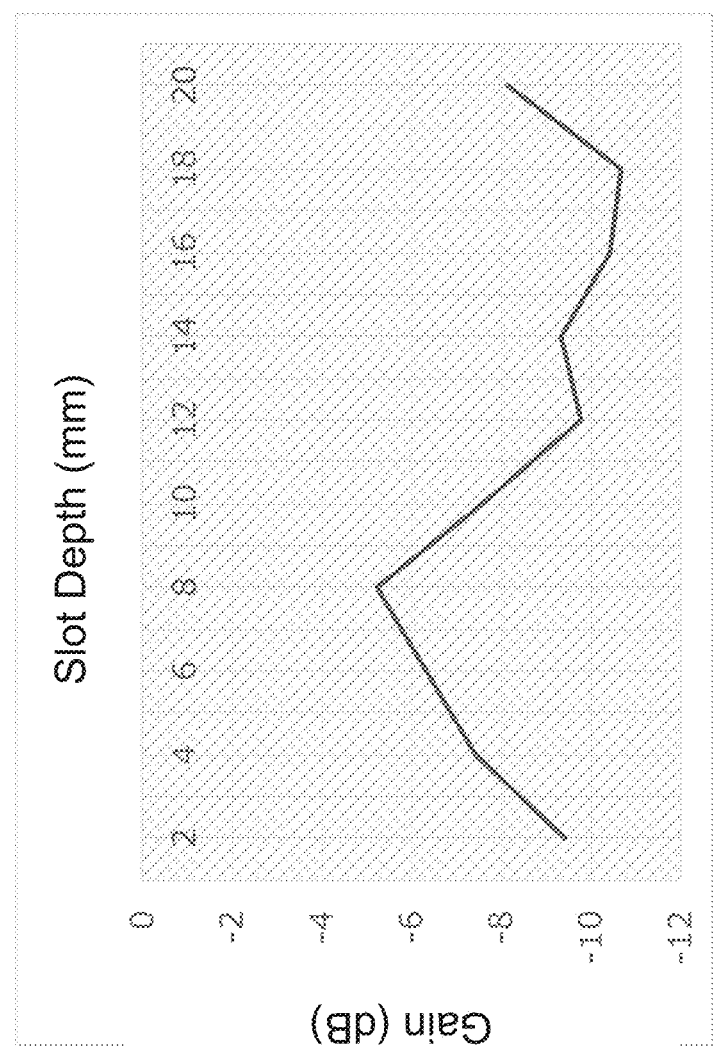
FIG. 17 is an example plot of slot depth versus gain for an antenna arranged on an antenna supporting structure in accordance with the present disclosure.

FIG. 17 shows an example plot of slot depth versus gain for an antenna arranged on an antenna supporting structure, such as one of the antenna disclosed herein. In one embodiment, the slot depth (or length L1) is 7-8 mm for a 7 GHz RF signal. The slot depth is frequency dependent. As an example, the slot depth may be greater than or equal to the $\lambda_{eff}/4$. In one embodiment, the slot depth is equal to 5.35 mm. The gain is not necessarily the peak gain of the antenna, but rather is gain for a selected orientation of the antenna. The gain at the slit side of the antenna is improved with slit depth greater than 8 mm due to balanced ground on opposite sides of the antenna. However, if as the slit depth becomes too large, resulting in a reduced grounded area on a corresponding side of the antenna, the less gain of the antenna. The reduced ground, after a certain depth, impacts overall performance of the antenna gradually. The reduction in the overall ground impacts the antenna performance in all directions.

Figure 18:
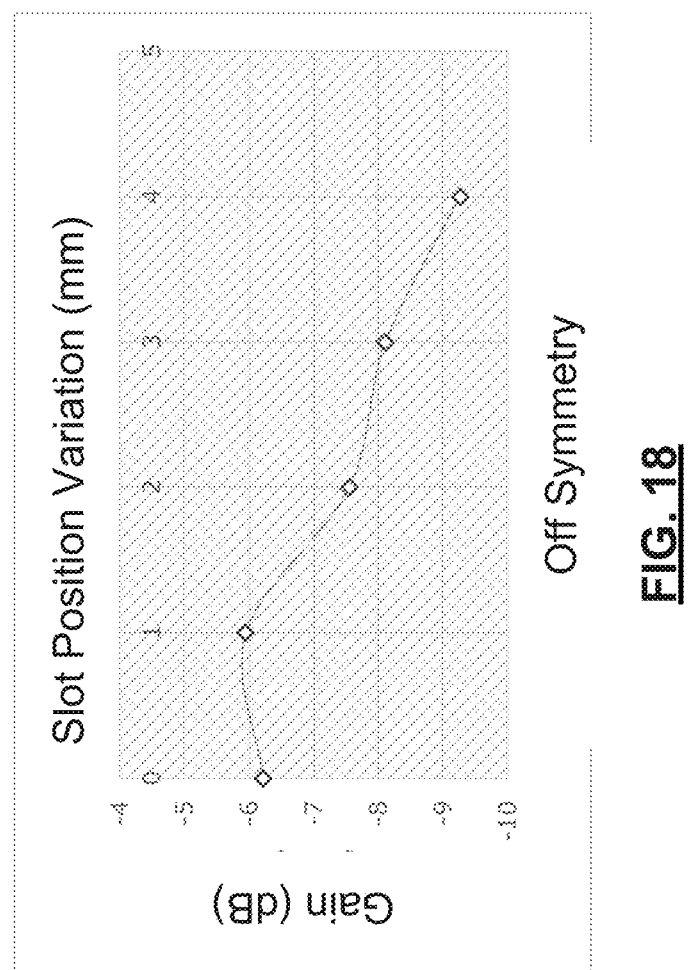
FIG. 18 is an example plot of slot position variation versus gain for an antenna arranged on an antenna supporting structure in accordance with the present disclosure.

FIG. 18 shows an example plot of slot position variation versus gain for an antenna arranged on an antenna supporting structure, such as one of the antenna disclosed herein. Antenna is provided with balanced grounded areas to ensure omni-directional performance. Deviation from symmetry of the grounded structure (or one or more grounded layers) of the antenna supporting structure may reduce the gain of the antenna. Symmetry may refer to geometrical symmetry and/or electrical symmetry. The grounded structure may be geometrically symmetric relative to a centerline of the antenna (e.g., the centerline 307 of the antenna 304 of FIG. 3) when the antenna is electrically symmetric (or has a symmetric radiation pattern) relative to the centerline of the antenna. The centerline of the antenna refers to a line extending through a center of the antenna parallel to the centerline (e.g., centerline 305 of FIG. 3) of the corresponding grounded structure. If the antenna is not electrically symmetric, then the grounded structure may not be geometrically symmetric to compensate for the off electrical symmetry (or non-electrical symmetry) of the antenna to improve gain and/or symmetry of the radiation pattern of the antenna. Geographical symmetry refers to when (i) the width and/or size of the grounded area on a first side of the antenna is equal to the width and/or size of the grounded area on the second (or opposite) side of the antenna, and (ii) the grounded area on the first side of the antenna is a same distance from the antenna and in a same position relative to an edge of the corresponding PCB along which the antenna is mounted as the grounded area on the second side of the antenna.

Although the terms first, second, third, etc. may be used herein to describe various distances, boundaries, rates, periods, steps, elements, components, regions, layers and/or sections, these distances, boundaries, rates, periods, steps, elements, components, regions, layers and/or sections should not be limited by these terms, unless otherwise indicated. These terms may be only used to distinguish one distance, boundary, rate, period, step, element, component, region, layer or section from another step, element, component, region, layer or section. Terms such as "first," "second," and other numerical terms when used herein do not imply a sequence or order unless clearly indicated by the context. Thus, a first distance, boundary, rate, period, step, element, component, region, layer or section discussed below could be termed a second distance, boundary, rate, period, step, element, component, region, layer or section without departing from the teachings of the example embodiments.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A radio frequency (RF) circuit comprising:
   an antenna;
   a printed circuit board comprising a stack of layers, wherein the stack of layers includes a grounded layer, wherein
      the grounded layer comprises a slit, a dielectric area, a first grounded area and a second grounded area,
      the dielectric area includes dielectric material and is disposed between the first grounded area and the second grounded area,
      the antenna is edge mounted to the ground layer adjacent the dielectric area and offset from a centerline of the ground layer, and
      the second grounded area is disposed between the dielectric area and the slit; and
   a RF chip mounted to the stack of layers and connected to the antenna via a transmission line and configured to transmit and receive RF signals via the antenna.

2. The RF circuit of claim 1, wherein the slit extends through the stack of layers of the printed circuit board.

3. The RF circuit of claim 1, wherein a width of the second grounded area on a second side of the antenna is within a predetermined range of a width of the first grounded area on a first side of the antenna opposite the second side of the antenna.

4. The RF circuit of claim 1, wherein a width of the second grounded area on a second side of the antenna is equal to a width of the first grounded area of a first side of the antenna opposite the second side of the antenna.

5. The RF circuit of claim 1, wherein the first grounded area and the second grounded area are geometrically symmetric relative to a centerline of the antenna.

6. The RF circuit of claim 1, wherein the first grounded area and the second grounded area are not geometrically symmetric relative to a centerline of the antenna.

7. The RF circuit of claim 1, wherein a width of the first grounded area and a width of the second grounded area are greater than a quarter wavelength of the RF signals.

8. The RF circuit of claim 1, wherein a width of the slit is greater than a tenth of an effective wavelength of the RF signals, where the effective wavelength is equal to a wavelength divided by a square root of a dielectric constant of a dielectric material disposed between the transmission line and a ground line.

9. The RF circuit of claim 1, wherein a length of the slit into the printed circuit board is equal to or within a predetermined range of one half an effective wavelength of the RF signals, where the effective wavelength is equal to a wavelength divided by a square root of a dielectric constant of a dielectric material disposed between the transmission line and a ground line.

10. The RF circuit of claim 1, wherein at least one dimension of the slit is based on a frequency of at least one of the RF signals.

11. The RF circuit of claim 1, wherein at least one dimension of the second grounded area is based on a frequency of at least one of the RF signals.

12. The RF circuit of claim 1, wherein a material of the printed circuit board is based on a frequency of at least one of the RF signals.

13. The RF circuit of claim 1, wherein:
the antenna is mounted to a first side of the printed circuit board; and
the RF chip is mounted to a second side of the printed circuit board opposite the first side.

14. The RF circuit of claim 13, wherein the first side is a top side of the printed circuit board and the second side is a bottom side of the printed circuit board.

15. The RF circuit of claim 13, wherein the first side is a bottom side of the printed circuit board and the second side is a top side of the printed circuit board.

16. The RF circuit of claim 1, wherein the antenna is mounted to a same side of the printed circuit board as the RF chip.

17. The RF circuit of claim 1, wherein:
the first grounded area is on a first side of the antenna;
the second grounded area is on a second side of the antenna;
the antenna is mounted along an edge of the printed circuit board such that a third side of the antenna is adjacent to the edge; and
the transmission line extends from a fourth side of the antenna opposite the third side.

18. The RF circuit of claim 1, wherein the antenna is at least one of linear polarized, circular polarized, spherically polarized, is toroidally polarized.

19. The RF circuit of claim 1, wherein the RF signals are in at least one of a 2.4 GHz band, an 8 GHz band, or over an ultra-wideband range of 500 MHz.

20. A first network device comprising:
the RF circuit of claim 1; and
a module configured to exchange RF signals with a second network device via the antenna,
wherein the first network device is a portable network device or a network device mounted within a vehicle.

21. A vehicle comprising the first network device of claim 20, wherein the module is configured to:
exchange the RF signals with the second network device to authenticate the second network device and determine a range of the second network device relative to the vehicle; and
based on the range of the second network device, permit access to the vehicle.

22. The first network device of claim 20, wherein the module is configured to exchange the RF signals with the vehicle via the antenna to authenticate the first network device and provide access to the vehicle.

23. A radio frequency (RF) circuit comprising:
an antenna;
a printed circuit board comprising a stack of layers, wherein the stack of layers includes a grounded layer and a slit that extends through the stack of layers,
wherein
the grounded layer comprises a dielectric area, a first grounded area and a second grounded area,
the dielectric area includes dielectric material and is disposed between the first grounded area and the second grounded area, and
the antenna is mounted to the ground layer adjacent the dielectric area and offset from a centerline of the ground layer, and
the second grounded area is disposed between the dielectric area and the slit, wherein a width of the second grounded area between the dielectric area and the slit is within a predetermined range of a width of the first grounded area between the dielectric area and an edge of the grounded layer; and
a RF chip mounted to the stack of layers and connected to the antenna via a transmission line and configured to transmit and receive RF signals via the antenna.

24. The RF circuit of claim 23, wherein the width of the second grounded area is equal to the width of the first grounded area.

25. The RF circuit of claim 23, wherein a width of the first grounded area and a width of the second grounded area are greater than a quarter wavelength of the RF signals.

26. The RF circuit of claim 23, wherein a width of the slit is greater than a tenth of an effective wavelength of the RF signals, where the effective wavelength is equal to a wavelength divided by a square root of a dielectric constant of a dielectric material disposed between the transmission line and a ground line.

27. The RF circuit of claim 23, wherein a length of the slit into the printed circuit board is equal to or within a predetermined range of one half an effective wavelength of the RF signals, where the effective wavelength is equal to a wavelength divided by a square root of a dielectric constant of a dielectric material disposed between the transmission line and a ground line.

28. The RF circuit of claim 23, wherein the first grounded area and the second grounded area are geometrically symmetric relative to a centerline of the antenna.

29. The RF circuit of claim 23, wherein the first grounded area and the second grounded area are not geometrically symmetric relative to a centerline of the antenna.

* * * * *